(12) United States Patent
Kikuchi

(10) Patent No.: US 8,855,503 B2
(45) Date of Patent: Oct. 7, 2014

(54) OPTICAL RECEIVER AND OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 13/808,488

(22) PCT Filed: Jul. 9, 2010

(86) PCT No.: PCT/JP2010/061704
§ 371 (c)(1),
(2), (4) Date: Jan. 4, 2013

(87) PCT Pub. No.: WO2012/004890
PCT Pub. Date: Jan. 12, 2012

(65) Prior Publication Data
US 2013/0108276 A1    May 2, 2013

(51) Int. Cl.
*H04B 10/61*    (2013.01)
*H04B 10/00*    (2013.01)
*H04B 10/69*    (2013.01)
*H04B 10/67*    (2013.01)
*H04B 10/60*    (2013.01)

(52) U.S. Cl.
CPC .............. *H04B 10/00* (2013.01); *H04B 10/697* (2013.01); *H04B 10/677* (2013.01); *H04B 10/60* (2013.01); *H04B 10/612* (2013.01)
USPC ........................................................ 398/208

(58) Field of Classification Search
CPC .................................................. H04B 10/6165
USPC ................................................ 398/202–214
See application file for complete search history.

(56) References Cited

U.S. PATENT DOCUMENTS 8,655,193 B2 *    2/2014    Kikuchi .................... 398/208
2009/0208224 A1    8/2009    Kikuchi
(Continued)

FOREIGN PATENT DOCUMENTS

JP        2009-231881 A        10/2009
WO    WO 2007/132503 A1    11/2007
(Continued)

OTHER PUBLICATIONS

Kikuchi, Nobuhiko, et al.; Improvement of Chromatic Dispersion and Differential Group Delay Tolerance of Incoherent Multilevel Signaling with Receiver-side Digital Signal Processing; National Fiber Optic Engineers Conference, 2010; 3 pages.
(Continued)

*Primary Examiner* — Leslie Pascal
(74) *Attorney, Agent, or Firm* — Foley & Lardner LLP

(57) ABSTRACT

Optical receiver 300 uses two optical delay detectors 223 (set such that the delay times T are equal to symbol time and the phase differences are zero and 90 degrees) to receive an optical multilevel signal 215 and the output signals are A/D converted, thereafter subjected to retiming processes, and then subjected to a differential phase detection, thereby detecting a differential phase at a symbol center time point. In the receiver, the detected differential phase is integrated for each symbol and thereafter combined with an amplitude component obtained from a separately disposed optical intensity receiver, thereby reproducing an optical electric field. Thereafter, a wavelength dispersion compensation circuit (231) of a time period T is used to compensate for the wavelength dispersion of the transmission path. Moreover, an electric or optical Nyquist filter may be inserted to perform a band limitation, thereby enhancing the wavelength dispersion compensation effect.

19 Claims, 15 Drawing Sheets

(56) References Cited

U.S. PATENT DOCUMENTS

2009/0238580 A1    9/2009    Kikuchi
2010/0021179 A1    1/2010    Kikuchi
2010/0239267 A1    9/2010    Kikuchi

FOREIGN PATENT DOCUMENTS

WO    WO 2008/038337 A1    4/2008
WO    WO 2009/060920 A1    5/2009

OTHER PUBLICATIONS

Hongou et al., "1 Gsymbol/s, 64 QAM coherent optical transmission over 150 km with a spectral efficiency of 3 bit/s/Hz," Proc. Optical Fiber Communication Conf., Mar. 2007, Paper OMP3, Anaheim, CA, 3 pages.

Kikuchi et al., "First experimental demonstration of single-polarization 50-Gbit/s 32-level (QASK and 8-DPSK) incoherent optical multilevel transmission," Proc. Optical Fiber Communication Conf., Mar. 2007, PDP2, Anaheim, CA, 3 pages.

Griffin et al., "10 Gb/s Optical Differential Quadrature Phase Shift Key (DQPSK) Transmission using GaAs/AlGaAs Integration," Optical Fiber conference, 2002, pp. FD6-1-FD6-3.

Taylor M.G., "Coherent detection method using DSP to demodulate signal and for subsequent equalization of propagation impairments," European Conference on Optical Communication, 2003, Paper WE4. P.111, 2 pages.

PCT International Search Report on application PCT/JP2010/061704 mailed Sep. 28, 2010; 2 pages.

\* cited by examiner

OPTICAL RECEIVER AND OPTICAL TRANSMISSION SYSTEM

TECHNICAL FIELD

The present invention relates to optical information transmission technology, and relates in particular to an optical receiver and optical transmission system ideal for receiving multilevel optical information transmitted by way of optical fibers.

BACKGROUND ART

In recent years, the quantity of information (transmission capacity) transmittable on a single optical fiber is continually increasing due to an increase in the number of multiplexed wavelengths and higher optical signal modulation speeds. Increasing the information volume transmitted by way of optical fibers still further, requires boosting the utilization efficiency of the frequency band by devising a signal modulation method and cramming a large number of optical signals into a limited frequency band.

In the world of wireless communications, multilevel modulation (technology) makes high-efficiency transmission possible that exceeds a frequency utilization efficiency of 10. Multilevel modulation also appears promising for use in optical fiber transmissions and many studies have been made in the related art. In non-patent literature 1 for example, technology utilizing QPSK (Quadrature Phase Shift Keying) to perform 4-level phase modulation has been reported. In non-patent literature 2, technology for 32-level amplitude and phase modulation combining 4-level amplitude modulation and 8-level phase modulation has been reported.

(A) through (D) of FIG. 1 are drawings showing the signal point positions in the various modulation methods of the related art, and that describe the complex phase plane utilized in optical transmission. Signal points (complex notation on the optical electric field at the recognition time) for each type of optical multilevel signal point are plotted on the complex phase plane (also complex plane, phase plane, IQ plane).

(A) in FIG. 1 is a drawing for describing the signal points on the IQ plane. Each signal point can be displayed as complex coordinates (IQ coordinates) or polar coordinates shown as the amplitude r(n) and phase φ(n) in the figure.

(B) in FIG. 1 is a drawing showing an example of 4-level phase modulation (QPSK) signal point placement, and the four ideal signal points (symbols) utilized in transmitting multilevel signals are displayed on the complex phase plane Each of these ideal signal points is a fixed amplitude. The phase angle φ(n) is placed at the four positions: 0, π/2, π, and −π/2. Two bits of information (00, 01, 11, 10) can be transmitted per one symbol by transmitting one among these four symbols. Differential quadrature phase shift keying (DQPSK) that performs differential encoding beforehand is generally used if directly receiving (non-coherent receiving) this signal by using an optical delay detector however the signal point placement is the same for both (QPSK/DQPSK) so the present specifications do not differentiate between the two methods.

(C) in FIG. 1 is a drawing showing 16-level quadrature amplitude modulation (16 QAM) widely utilized in wireless (radio) communication. In 16 QAM the ideal signal points are arrayed in a matrix, and four bits of information can be transmitted per one symbol. In the example shown in the drawing, the upper two bit(10xx, 11xx, 01xx, 00xx) values are expressed as Q axis coordinates, and lower two bit (xx10, xx11, xx01 xx00) values are expressed as I axis coordinates.

The distance between signal points can be increased for this signal placement and so (16 QAM) is known to provide high receiving sensitivity. In optical communications this type of quadrature amplitude modulation has been reportedly achieved by using a coherent optical receiver. The non-patent literature 3 for example, reports an experimental example for transmitting and receiving 64 QAM signals. Coherent optical receivers utilize a local light emitter source mounted in the receiver in order to detect the phase angle of the optical signal.

(D) in FIG. 1 is a drawing showing 16-level amplitude phase shift keying (16 APSK) in which 2-level amplitude modulation and 8-level phase modulation are superimposed. In 16 APSK, the 16 signal points are arrayed eight each in two concentric circle shapes having different amplitudes (symbol set is increased). A variety of signal point placements are in this way under evaluation for multilevel signals.

Studies are also being made on the other hand to boost the modulation speed on each wavelength (channel) to attain speeds ranging from 10 Gbit per second to 40 Gbit per second in order to expand the optical transmission capacity. However, increasing the modulation speed in this way causes the transmission quality to drastically deteriorate due to wavelength dispersion in optical fibers or non-linear effects such as the self-phase modulation effect. In the case of optical transmission, the effect from wavelength dispersion causes the optical transmission distance to decrease by half the square of the signal bit rate. So in optical transmissions at 10 Gbit per second or more, a dispersion compensator is needed for compensating for wavelength dispersion occurring along the transmission path between the end of the optical signal receiver and optical relay device. During optical transmissions at 40 Gbit per second for example, the capability of a typical dispersion fiber to withstand wavelength dispersion is a mere five kilometers. Adaptive compensation techniques that automatically limit degradation in signal quality to a minimum by utilizing a variable wavelength dispersion compensator mounted at the end of the optical receiver are now under evaluation.

However the variable wavelength dispersion compensator also presents many issues such as device size, complexity, cost, and control speed that must be resolved. In recent years, studies have been made of utilizing electrical stage compensation technology to estimate the received symbols by maximum likelihood sequence estimation (MLSE) and mounting electrically adaptive equalization circuits such as feed forward equalization circuits (FFE) or decision feedback equalization circuits (DFE) in the electrical circuits of optical signal receivers. However, wavelength dispersion compensation of electrical stages using the technology of the related art is incomplete since that technology only reforms the eye (I-plane) opening of the received optical waveform. The compensation effect was therefore at such an inadequate level that the receiver capability to withstand wavelength dispersion was effectively expanded just 1.5 to 2 times so that the transmission distance during normal optical fiber transmission at for example 40 Gbit per second only extended up to 10 kilometers.

One technology to resolve the aforementioned problems is for example the coherent optical electric field receiver system disclosed for example in non-patent document 4 (first technical example)

There is also on the other hand the phase pre-integrated type optical multilevel signal transmission system utilizing direct detection as previously proposed by the present inventors (second technical example). This scheme achieves a low cost, lower power consumption and also compact optical multilevel transmitter/receiver without utilizing a coherent detector and a detailed description is disclosed in patent document 1.

In patent document 2 serving as a third technical example the present inventors proposed an optical electric field receiver including a wavelength dispersion compensation function utilizing a delay detector.

CITATION LIST

Patent Literature

Patent document 1: International Patent Application Publication No. WO2009/060920
Patent document 2: International Patent Application Publication No. WO2007/132503

Non-Patent Literature

Non-patent document 1: R. A. Griffin, et. Al, "10 Gb/s Optical Differential Quadrature Phase Shift Key (DQPSK) Transmission using GaAs/AlGaAs Integration,", OFC2002, paper PD-FD6, 2002 Non-patent document 2: N. Kikuchi, K. Mandai, K. Sekine and S. Sasaki, "First experimental demonstration of single-polarization 50-Gbit/s 32-level (QASK and 8-DPSK) incoherent optical multilevel transmission," in Proc. Optical Fiber Communication Conf. (OFC/NFOEC), Anaheim, Calif., March 2007, PDP21.
Non-patent document 3: J. Hongou, K. Kasai, M. Yoshida and M. Nakazawa, "1 Gsymbol/s, 64 QAM Coherent Optical Transmission over 150 km with a Spectral Efficiency of 3 Bit/s/Hz," in Proc. Optical Fiber Communication Conf. (OFC/NFOFEC), Anaheim, Calif., March 2007, paper OMP3.
Non-patent document 4: M. G. Taylor, "Coherent detection method using DSP to demodulate signal and for subsequent equalization of propagation impairments," paper We4. P. 111, ECOC 2003, 2003

SUMMARY OF INVENTION

Technical Problem

The respective overview of the above first through the third technical examples is first of all described and the respective issues explained.

FIG. 2 is a block diagram of the polarization diversity coherent optical electric field receiver serving as the first technical example. The polarization diversity coherent optical electric field receiver simultaneously receives information for two polarized optical signals. An input optical signal 1101 sent along an optical fiber transmission path is split into a horizontal (S) polarization wave component 1105 and a perpendicular(P) polarization wave component 1106 by a polarized wave splitter circuit 1102-1. The now separated (S) polarization wave component 1105 and (P) polarization wave component 1106 are respectively input to the coherent optical electric field receiver 1100-1 and the coherent optical electric field receiver 1100-2.

The coherent optical electric field receiver 1100-1 utilizes a local emission laser light source 1103 having approximately the same wavelength as the input optical signal 1101 as the optical phase reference. The local emission light 1104-1 output from the local emission laser light source 1103 is separated by the polarized wave splitter circuit 1102-2 into two local emission lights, namely a local emission light 1104-2 and local emission light 1104-3. The separate local emission light 1104-2 and local emission light 1104-3 are respectively input to the coherent optical electric field receiver 1100-1 and the coherent optical electric field receiver 1100-2.

In the coherent optical electric field receiver 1100-1, the optical phase diversity circuit 1107 combines the (S) polarization wave component 1105 of optical multilevel signal and the local emission light 1104-2 that were input. The optical phase diversity circuit 1107 generates an I (same phase) component output light 1108 extracted from the combined same-phase components of the (S) polarization wave component 1105 for the optical multilevel signal and the local emission light 1104-2; and a Q (quadrature) component output light 1109 extracted from the quadratic components of the combined (S) polarization wave component 1105 for the optical multilevel signal and the local emission light 1104-2. The balanced optical receivers 1110-1 and 1110-2 respectively receive the I component output light 1108 and the Q component output light that were generated. The received I component output light 1108 and the Q component output light are converted into electrical signals. These converted two electrical signals are respectively time-sampled in the A/D converter 1111-1 and 1111-2, and generated as the digital output signals 1112-1 and 1112-2.

In the following description, the optical electric field of the received input optical signal 1101 is written as $r(n)\exp(j\phi(n))$ as shown in (A) of FIG. 1. Here, the optical electric field of the local emission light 1104-2 and the local emission light 1104-3 are assumed as 1 (essentially includes an optical frequency component but which is omitted here). Also r denotes the amplitude of the optical electric field, $\phi$ denotes phase of the optical electric field, and n denotes the sampling time. The local emission light 1104 actually includes random phase noise and a miniscule amount of differential frequency components between the local emission light and signal light, etc., however these phase noise and differential frequency components exhibit a gentle phase rotation over time and can be ignored due to elimination by digital signal processing. The balanced optical detector 1110-1 and the balanced optical detector 1110-2 perform homodyne detection of the input optical signal 1101 that was input utilizing the respective local emission light 1104-2, and output the same-phase component and the quadrature component in the optical electric field of the input optical signal 1101 using the respective local emission light as a reference standard.

The output signal 1112-1 of the A/D converter 1111-1 therefore is labeled $I(n)=r(n)\cos(\phi(n))$; and the output signal 1112-2 of the A/D converter 1111-2 is labeled $Q(n)=r(n)\sin(\phi(n))$. However in order to simplify the formula, the constants such as the conversion efficiency are all set to "1." In the coherent optical electric field receiver, all information (here, I component and Q component) labeled by optical field $r(n)\exp(\phi(n))$ can be easily obtained from the input optical signal 1101 that was received and so allows receiving a multilevel optical signal.

The digital processor circuit 1113 is a complex electric field processing circuit that is capable of cancelling out virtually all effects such as linear degradation by applying an inverse function versus linear degradation (e.g. wavelength dispersion) received during transmission of the optical signal. If necessary the digital processor circuit 1113 does processing such as clock extraction and resampling is performed, and outputs the now processed same-phase component 1114-1 of the optical electric field signal and the wave signal.

The coherent optical electric field receiver 1100-1 can obtain electric field information for one polarization wave component (e.g. S polarization wave component) of the received input optical signal 1101 as already described however the P polarization wave component must also be received because the polarized wave state of the optical signal fluctuates during optical fiber transmission. Whereupon the coherent optical electric field receiver 1100-2 receives the P polarization wave component of the input optical signal 1101 in the same way, and outputs the electric field information of the received P polarization wave component as the optical electric field signal 1114-3 and the optical electric field signal 1114-4. The digital processor-symbol decision circuit 1115 eliminates fluctuations in the polarization wave state by converting the polarization wave state of the optical signal (e.g. converts a linear polarization wave to a circular polarization wave) to I components and Q components of each polarization wave output from the digital processor circuit 1113. The digital processor-symbol decision circuit 1115 next judges with high accuracy which symbol was transmitted by for example comparing with the signal point placement shown in (C) in FIG. 1, and then outputs the judgment results as the multilevel digital signal 1116.

Utilizing the above described coherent optical electric field receiver allows obtaining all of the electric field information for the received signals and even receiving complicated multilevel signals. The coherent optical electric field receiver offers the merit of being able in particular to theoretically fully compensate for linear degradation caused by wavelength dispersion, etc., by processing the input signal using the inverse function of the carrier function on the optical fiber transmission path. However, the coherent optical electric field receiver requires two receivers in order to receive the two polarization wave components. Moreover an extra laser light source to serve as the local emission light source is also required within the receivers. Therefore, factors such as the size, cost, and the large power consumption are problems.

In the second technical example in FIG. 3 on the other hand, FIG. 3 is a circuit diagram of the phase pre-integrated type optical multilevel signal transmission system using direct detection as previously proposed by the present inventors. This scheme achieves an optical multilevel receiver that is compact and also low-cost with low power consumption and does not utilize coherent detection.

Inside the phase pre-integrated optical electric field transmitter 1200, non-modulated laser light output from the laser light source 1210 is input to an optical electric field modulator 1211. A transmit optical multilevel signal 1213 subjected to the necessary electric field modulation is output from the output optical fiber 1213. Also, a multilevel encoder circuit 1202 converts a binary digital information signal 1201 for transmission, into a complex multilevel information signal 1203. This signal is a digital electric multilevel signal expressed with (i, q) on the two-dimensional IQ plane; and its real part i and imaginary part q are output at each time period T (=symbol time). In this example, the 16 QAM signal is utilized as an example of the complex multilevel information signal 1203.

The present signal is input to a phase pre-integration unit 1204 which digitally integrates just the phase components at a time period T, to convert those phase components to a phase pre-integration complex multilevel information signal 1205. Here, converting the complex multilevel information signal 1203 $Ei(n)=(i(n), q(n))$ that was input, to polar coordinates on a complex plane, allows a notation for example of $Ei(n)=i(n)+jq(n)=r(n)\exp(j\phi(n))$ (and the j denotes imaginary units). Here, n denotes the symbol number of the digital signal; $r(n)$ is the symbol amplitude of the digital signal; and $\phi(n))$ denotes the phase angle. The notation for the phase pre-integration signal output at this time with the same polar coordinates can be $Eo(n)=i'(n)+jq'(n)=r(n)\exp(j\theta(n))=r(n)$ $\exp(j\Sigma\phi(n))$. The $\phi(n)$ at this time is the phase angle of the output signal, the $\Sigma\phi(n)$ is the value from the past phase angles $\phi(1), \ldots, \phi(n)$ cumulatively summed at each time T. This output signal is output as the phase pre-integration complex multilevel signal 1205 after converting to polar coordinates again. This phase pre-integration processing places the 16 QAM signal point on a concentric circle that is greatly different from the original 16 QAM signal.

This signal is input to the sampling speed converter circuit 1206, and the sampling speed then supplemented so that the sampling speed is two samples/signals or more. A pre-equalizer circuit 1207 then adds an inverse function to the phase pre-integration complex multilevel information signal to eliminate the degradation occurring on the optical transmission path 1214 and elsewhere. Next, the signal is separated into real units "i" and imaginary units "q" and these units are next converted into high-speed analog signals by the DA converters 1208-1, 1208-2. After amplifying these two analog signals in the driver circuits 1209-1 and 1209-2, the two amplified signals are input to the modulation terminals I, Q2 of the optical electric field modulator 1211. A transmit optical multilevel signal 1213 containing a pre-equalizing phase integration signal $(I''(n), q''(n))$ in the same-phase component I and the quadrature component Q of optical electric field can in this way be generated. The optical electric field of the transmit optical multilevel signal 1213 is $(i''(n)+jq''(n))\exp(j\omega(n))$; and $\omega(n))$ is the optical angular frequency of the laser light source 210. This transmit optical multilevel signal 213 is in other words equivalent to $(i''(n), q''(n))$ in the vicinity of the equalization low level range with the optical frequency components removed.

The transmit optical multilevel signal 1213 is transmitted along the optical fiber transmission path 1214 and amplified in the optical amplifier along with sustaining transmission degradation such as bandwidth dispersion from the optical fiber, and is input as the received optical multilevel signal 1215 to the non-coherent optical electric field receiver 1220. The pre-equalizer circuit 1207 applies an inverse function in advance for mutually cancelling out transmission degradation so that the optical electric field of the received signal is equivalent to the phase pre-integration complex multilevel information signal 1205.

An optical splitter(branching circuit) 1222 inside the front end of the non-coherent optical electric field receiver branches the received optical multilevel signal 1215 into three optical signal paths that are input to the first optical delay detector 1223-1, a second optical delay detector 1223-2, and an optical intensity detector 1225. The first optical delay detector 1223-1 is set approximately equivalent to the symbol time T of a multilevel optical information signal received at a delay time Td on one of the two paths, and moreover is set so that the optical phase difference between the two paths will be 0. The second optical delay detector 1223-2 has the delay time Td=T on one of the two paths and is set so that the optical phase difference between the two paths will be $\pi/2$. The balanced type optical detectors 1224-1 and 1224-2 convert the two output light from the first and second optical delay detector 1223-1 and 1223-2 into electrical signals which are later converted by the respective A/D converters 1226-1 and 1226-2 into the digital signals $dI(n)$ and $dQ(n)$. The A/D converter 1226-3 also converts the electrical signal output from the optical intensity detector 1225 that detects the optical intensity of the input light is converted into a digital signal $P(n)$.

These digital signals $dI(n)$, $dQ(n)$ are input to the inverse tangent processing circuit 1227. Here, the inverse tangent processing circuit 1227 implements inverse tangent processing on the two variables utilizing dI(n) as the X component, and dQ(n) as the Y component and this phase angle then calculated. If labeling the optical electric field of the received optical multilevel signal 1215 as r(n)exp(jθ(n)) then dI(n)∝r(n) r(n−1) cos(Δθ)), dQ(n) ∝r(n) r(n−1) sin(Δθ(n)). Here, Δθ(n) is the phase differential (θ(n)−θ(n−1)) from the symbol immediately prior to the received n-th optical electric field symbol. The dI (n), dQ (n) are respectively the sine and cosine portions for Δθ(n) and so the Δθ(n) can be calculated by processing the inverse tangent of the four quadrants in the inverse tangent processing circuit 227.

The received optical electric field signal has a phase angle of θ(n)=Σφ(n) in order to perform phase pre-integration on the transmitting side as previously described in this structure. The output signal from the inverse tangent circuit 1227 therefore becomes Δθ(n)=Σφ(n)−Σφ(n−1)=φ(n) and the phase component θ(t) of the original complex multilevel information signal 1203 can be extracted.

The output signal P from the optical intensity detector on the other hand can be input to the square root circuit 1228 and the original electric field amplitude r(n)=sqrt(P(n)) obtained as the output. Therefore, inputting the obtained amplitude component r(n) and the phase component φ(n) into the quadratic coordinate converter circuit 1229 provides the quadrature (orthogonal) coordinate expression of (i, q)=r(n) exp (jφ(n)) as the demodulation receive electric field. This is the same signal point placement as the original complex multilevel information signal 1203. Inputting this signal into the symbol judgment circuit 1221 using the Euclidean distance to make a symbol judgment allows regenerating the multilevel symbol string 1230.

FIG. 4 is a diagram of the third technical example. The optical splitter 1222 branches the input optical multilevel signal 1215 into two optical signal and inputs the first and second optical signals respectively into the optical delay detector 1240-1 (set to a phase differential 0) and 1240-2 (set to phase differential π/2). The optical balance receivers 1224 (1224-1, 1224-2) convert the output from the optical delay detectors 1240-1, 1240-2 into electrical x, y signals, that are supplied to an electric field processing unit 1244 by way of the A/D converters 1226 (1226-1, 1226-2) and delay adjuster circuits 1242 (1242-1, 1242-2). The delay (quantity) of the optical delay detectors 1240 in the figure is T/2 (symbol time T) and this delay interferometer outputs the optical signal received at time T to interfere with the optical signal prior to time t−T/2. The present technical example finds the optical electric field at half of each time period T/2 in the case of the second technical example, regenerates the optical electric field information inside the receiver based on the Nyquist theorem, and implements wavelength dispersion compensation.

Hereafter, setting the sampling period of the A/D converters 1241-1, 1241-2 as T/2, makes the optical electric field of the received light as r(n)exp(φ(n)) so that the electrical received signals x1243-1, y1243-2 are respectively written to express r(n) r(n−1) cos(Δφ(n)), r(n) r(n−1) sin(Δφ(n)) (constant for quantum efficiency is omitted). Here, Δφ(n) equals φ(n)−φ(n−1). The differential phase Δφ(n) can therefore be processed by implementing the inverse tangent processing (ArcTan) of the signals x, y in the inverse tangent processing circuit 1227. By adding this differential phase Δφ(n) sums one after another per the sample in the delay adder circuit 1246, the phase component φ(n) of the received electric field can be calculated as the regenerated optical electric field 1249-2.

This example can also on the other hand, calculate the amplitude information for the received optical electric field from the electrical received signals x1243-1, y1243-2. Namely, both of these signals are input to the square distance processing circuit 1245 and upon finding the square root of the sum of both squares, the processing result 1248-1 next becomes r(n) r(n−1). Assuming that the immediately prior received symbol for electric field r(n−1) is already known, the r(n) can be calculated by dividing the processing result 1248-1 by the immediately prior received symbol for the electric field r(n−1). In other words, the amplitude section r(n) of the received optical electric field can be found as the regenerated optical signal 1249-1 by inputting the processing result 1248-1 into the delay divider circuit 1247.

Combining the above items allows regenerating the received optical electric field so that in the above process at least two points among the sample points of the optical electric field can be obtained within the time for one symbol to fill the Nyquist sampling frequency and all optical electric field information can be obtained. The electric field waveform deteriorated due to the optical fiber transmission in this way can be regenerated digitally and therefore inputting this optical electric field information into the electric field compensation circuit 1250 and processing the inverse transfer function of the transmission path, allows fully correcting for all of the linear transmission degradation that occurred along the transmission path. As a result, functions such as wavelength dispersion compensation can be achieved.

A first objective of the present invention is to provide a practical optical receiver with a simple design that is capable of utilizing optional optical multilevel signals and also to allow compensating for linear degradation on transmission paths such as wavelength dispersion by internal signal processing in the receiver.

The coherent optical electric field receiver described in FIG. 2 as the first technical example is for example capable of utilizing optional optical multilevel signals and may further be capable of compensating for transmission degradation by signal processing in the receiver as described above, however the receiver requires an internal local emission light source and must also utilize a diversity structure and so on in order to possess polarization wave dependency and so has the problem that the size and cost of the receiver increase.

The phase pre-integrated type optical multilevel optical receiver described in FIG. 3 as the second technical example has a simple structure capable of utilizing optional optical multilevel signals by using phase pre-integration processing yet performs no coherent receiving. However in optical multilevel receivers that typically utilize delay detectors, the absolute phase for the optical electric field is not known, and optical electric field information cannot be directly obtained inside the receiver so compensating for linear degradation on transmission paths such as wavelength dispersion compensation is impossible.

In the third technical example in FIG. 4 an example is shown of an optical electric field receiver that calculates all information from the optical electric field by utilizing optical delay detection and that can also be utilized for multilevel transmission. However this scheme has the following problems.

First of all, this scheme has the problem that the continuity of the optical signal phase information is lost when the amplitude of the receive signal is approximately zero (in the case of sampling at the zero point). Namely, when the amplitude r(n) reaches zero even for just one cycle due for example to fluctuations in the waveform or effects from noise, the output from upstream and downstream optical delay detectors will become zero, and from then onwards the phase of all optical electric fields will be unstable. Therefore, non-coherent electric field regeneration schemes have the problem that, "regenerating an optical electric field is impossible when the amplitude of the received optical electric field is approximately zero." The third technical example in particular requires setting the delay of the delay detector to ½ the symbol time, and measuring the optical electric field two times during one symbol in order to provide compensation for wavelength dispersion and therefore has the problem that zero hits are likely to occur compared to the case of the second technical example. In other words, the multilevel modulated optical signal might allow an electric field near zero to pass especially at symbol boundaries where state transitions occur so that zero hits are prone to occur when making two samplings for one symbol. A method was disclosed for sampling the electric field at the shoulder section of the waveform in order to avoid this problem, however this method not only requires shifting the sampling timing but still leaves the possibility that zero hits may occur even at the shoulder section of the waveform should when there is large distortion on the waveform.

Secondly, there is the problem of accumulated phase differentials. In the third technical example, error and noise contamination become mixed in due to continually integrating the phase differential $\Delta\phi$ detected in the receiver so that the error for the integrated phase $\phi$ also accumulates. In this example, phase integration is performed twice for each symbol in order to compensate for wavelength dispersion causing the problem that errors tend to easily accumulate and accurate detection of optical electric field is impossible.

Whereupon a second object of the present invention is to resolve the above two described technical issues in the third technical example and allow easily implementing wavelength dispersion compensation and stable avoidance of effects from zero hits even in delayed detection schemes.

Solution to Problem

To resolve the above problems, the differential phase of the received signal can be digitally detected by a coupling type optical delay detecting receiver containing a delay approximately matching the symbol time Ts, integrating this differential phase for each symbol and synthesizing optical amplitude information to regenerate the optical electric field signal and then input this signal to a transmission degradation equalizer to equalize degradation in the transmission.

In the present invention, the optical electric field is calculated for each symbol so that the equalized time periods from the transmission degradation equalizer are most effective in approximately matching the symbol time Ts.

The timing for performing phase integration is set to approximately match the symbol center time of the received optical signal. More specifically, a retiming circuit is utilized to perform retiming and sampling speed conversion processing performed on the received signal so as to make the sampling time approximately match the center time of the received symbol. An even higher compensation effect can be achieved by performing wavelength dispersion compensation after converting the sampling time into a digital sample stream matching the symbol time Ts or utilizing a clock extraction circuit to make the AD converter sampling time approximately match the center time of the symbol.

Moreover the optical electric field receiver includes a phase fluctuation removal circuit and phase fluctuation (or jitter) can also be removed by inputting the optical electric field signal to the phase fluctuation removal circuit. Otherwise the optical electric field receiver can include an electrical phase differential detection circuit that matches the delay with the symbol time to perform the delay detection or differential detection on the entire optical electric field signal or just the phase components of that signal that was input by utilizing digital numeric processing.

The extracted optical electric field amplitude can be calculated by square root processing of the received signal string by utilizing an optical intensity (or power) receiver and AD converter and square root processing circuit.

The waveform degradation equalizer can be contrived from an adaptive equalizer circuit to automatically compensate for waveform degradation, or as a digital filter having inverse propagation characteristics relative to wavelength dispersion. Also, applying cumulative correction via an offset signal according to the amount of compensation is preferable in cases where the direct current offset of the output signal was lost when utilizing a balance type receiver.

A configuration that inserts the bandwidth amplitude into a bandwidth-narrowed Nyquist filter for a bandwidth of 1/(2Ts) or more and 1/Ts or less after A/D conversion in the receiver may also be considered if improving the compensation accuracy even further.

In optical transmission systems in particular containing optical electric field transmitters and optical fiber transmission paths and optical electric field receivers, a structure including a bandwidth-narrowed Nyquist filter in the optical electric field receiver for a bandwidth of 1/(2Ts) or more and 1/Ts or less to generate and output an optical electric field signal whose bandwidth has already been narrowed in the electrical region is even more ideal. These types of digital and analog electrical filters may be substituted by optical narrow bandwidth pass filters whose total equalized bandwidth is 1/Ts or more and 2/Ts or less and inserted along in the optical transmitter or the optical receiver or along optical transmission path to narrow the band.

The usefulness of transmission systems can be enhanced by allowing delay detection receiving achieved by integrating in advance the phase of optical signals for transmission for each symbol time by including a phase pre-integration circuit in the optical electric field transmitter. Useful long-distance transmission can be made possible by carrying out pre-equalizing for wavelength dispersion within the optical electric field transmitter.

A first solution aspect of the present invention provides an optical receiver including:

a coupling type optical delay detection receiver containing a delay approximately matching the symbol time of the received optical signal; an AD converter, a differential phase calculation circuit, a phase integration circuit, an optical amplitude detection unit to extract the amplitude component of the optical signal, an optical electric field signal regenerator circuit, and a transmission degradation equalizer circuit to compensate for transmission degradation on the transmission path; and moreover that receives optical signals that are optical modulated signal of two or more values for a predetermined symbol time; and in which the coupling type optical delay detection receiver includes a delay matching the symbol time of the received optical signal, and detects and outputs the received optical signal: and the AD converter converts the signal output from the coupling type optical delay detector to a digital signal; and the differential phase calculation circuit input by the digital signal, and calculates a differential phase with the optical signal of the just prior symbol time at approximately each symbol time; and the phase integration circuit is input by the calculated differential phase, and calculates phase information integrated at each symbol time in the received signal; and the optical amplitude detection unit extracts the amplitude component of the received optical signal; and the optical electric field signal regenerator circuit combines the calculated phase information and the optical amplitude information obtained by the optical amplitude detection unit, and regenerates an optical electric field signal; and the transmission degradation equalizer circuit is input by the regenerated optical electric field signal, and equalizes the transmission deterioration.

A second solution aspect of the present invention provides an optical transmission system including:

an optical transmitter to generate optical signals modulated by information signals; and the above described optical receiver, in which the optical signal that was output from the optical transmitter and sent along the optical fiber transmission path, is next received by the optical receiver, converted into an information signal and output.

Advantageous Effects of Invention

The present invention is capable of providing a practical optical receiver with a simple design capable of utilizing optional optical multilevel signals and also capable of compensating for linear degradation on transmission paths such as wavelength dispersion by internal signal processing in the receiver. Moreover, the present invention is capable of resolving the above two described technical problems in the third technical example, and allows easily implementing wavelength dispersion compensation and provides stable avoidance of effects from zero hits even in delayed detection schemes.

DESCRIPTION OF EMBODIMENTS

Figure 1A:
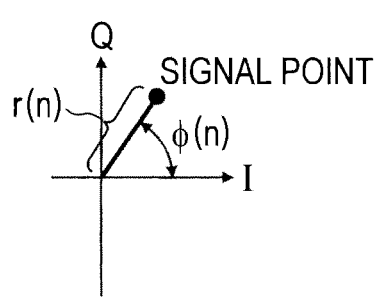
FIG. 1 describes the signal point placement and modulation methods capable of being applied to optical transmission, and includes the examples: (A) definition of amplitude and phase, (B) Quadrature Phase Shift Keying (4-level phase modulation) (QPSK), (C) 16-level quadrature amplitude modulation (16 QAM), (D) 16-level amplitude phase modulation (16 APSK).
Figure 1B:
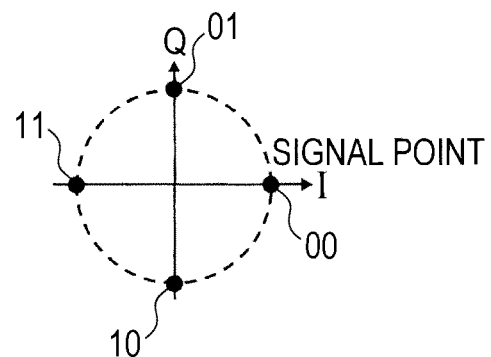
Figure 1C:
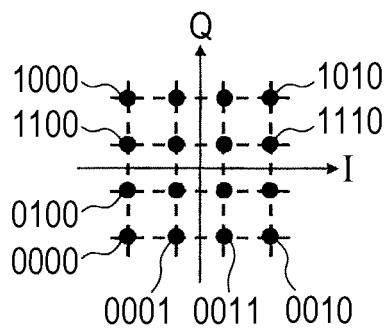
Figure 1D:
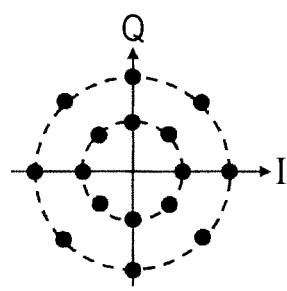
Figure 2:
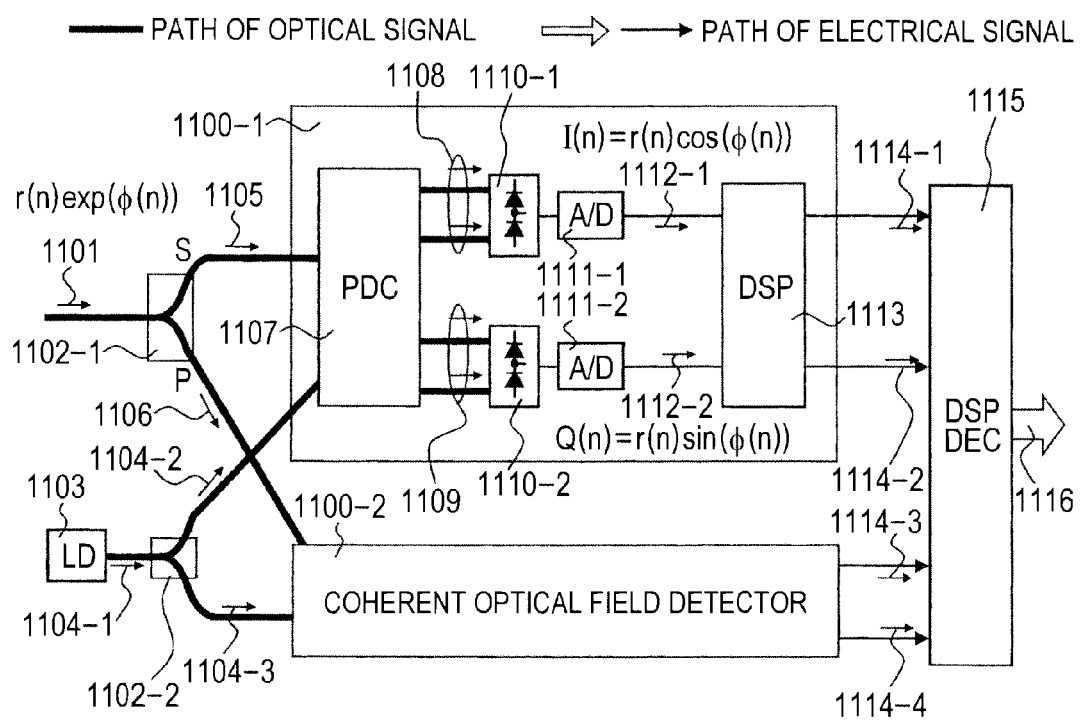
FIG. 2 is a block diagram showing one example of the coherent optical electric field receiver of the related art.
Figure 3:
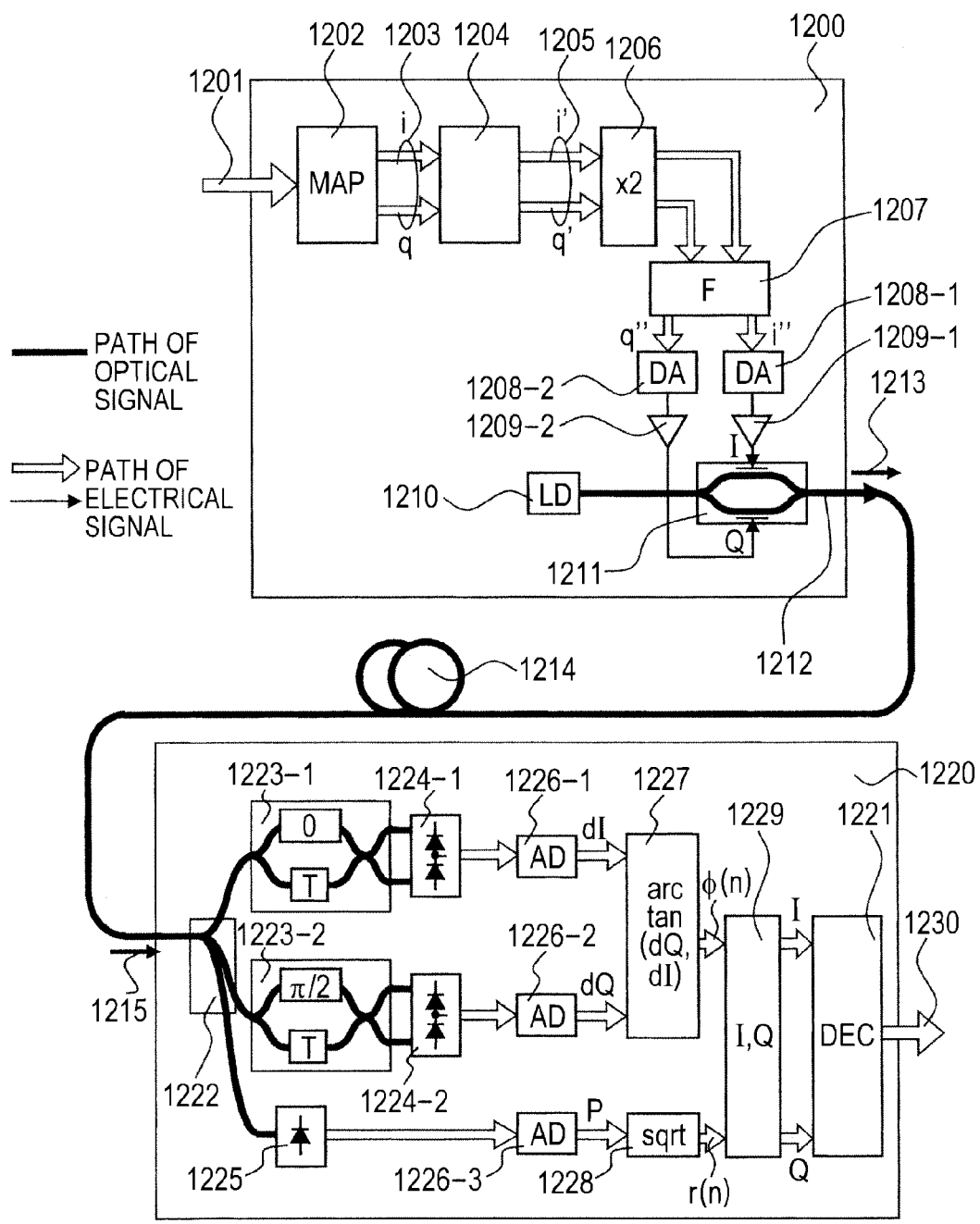
FIG. 3 is a block diagram showing one example of the optical multilevel transmission system utilizing direct detection of the related art.
Figure 4:
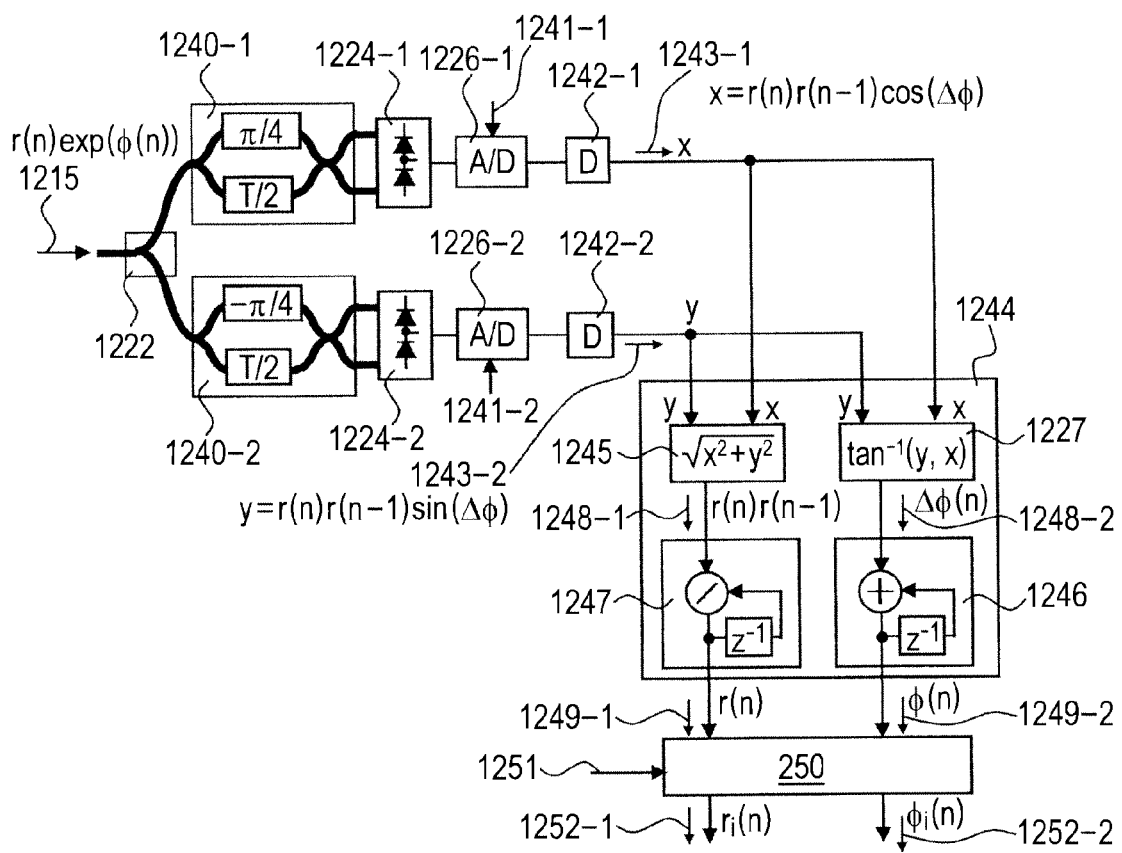
FIG. 4 is a block diagram showing one example of the optical electric field receiver utilizing direct detection of the related art.

Hereafter, the embodiments of the present invention are described while referring to the drawings.

In the structures in the drawings, the three digits in the reference numerals are the same for the structures in the first through the third technical examples. The reference numerals are not necessarily always identical for example, the sampling periods may differ, and the circuit scales may differ.

First Embodiment

Figure 5:
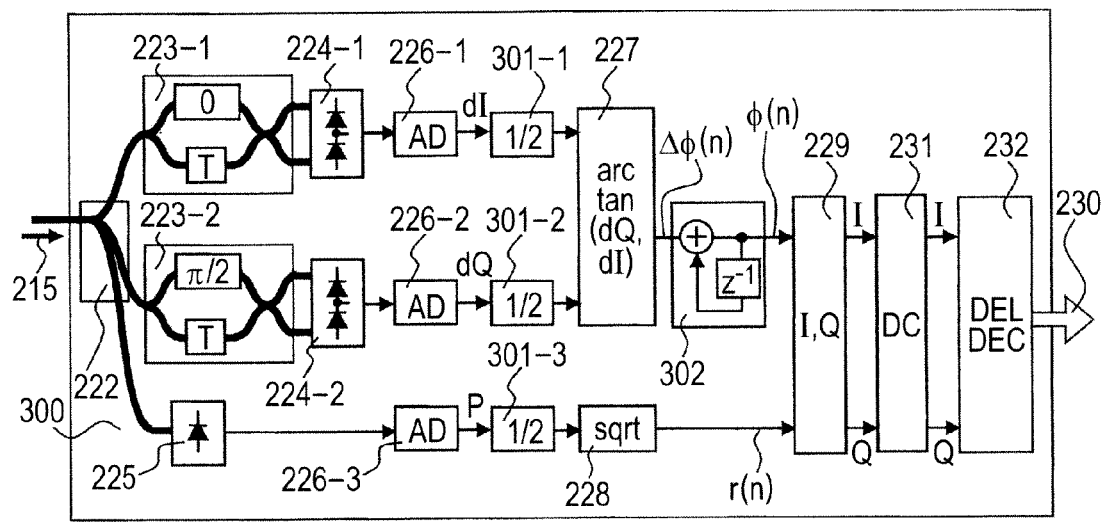
FIG. 5 is a block diagram showing the first embodiment of the optical electric field receiver of the present invention.

FIG. 5 is a block diagram of the first embodiment of the present invention and shows the structure of the optical electric field receiver(optical receiver) 300.

A receiving optical multilevel signal 215 is branched into three optical signal paths by an optical splitter 222 that are input to a first optical delay detector 223-1, a second optical delay detector 223-2, and an optical intensity receiver 225. This receiving optical multilevel signal 215 is an optical modulation signal with 2-level or more for a pre-established symbol time and that is sent from an optical transmitter and received by way of an optical fiber transmission path. The first optical delay detector 223-1 is set so that the delay time differential T of the two internal optical paths is approximately equivalent to a symbol time Ts of the optical multilevel information signal for receiving, and so that the optical phase differential on both paths reaches zero. The second optical delay detector 223-2 is set so that the delay time differential T along the two internal optical paths is approximately equivalent to Ts, and such that the optical phase differential on the two paths becomes $\pi/2$. The balance type optical receivers 224-1, 224-2 respectively convert the output light from the first and second optical delay detectors 223-1 and 223-2 into electrical signals, and are later converted by the AD converters 226-1, 226-2 into the high-speed digital signals dI(n), dQ(n). In this example, the sampling speed of the AD converters is set to double the symbol speed (=2/Ts). The electrical signal output from the optical intensity receiver 225 is converted into the digital signal P(n) in the AD converter 226-3. These digital signals dI(n), dQ(n), P(n) are afterwards input to the retiming & down-sampling circuits 301-1, 301-2, 301-3, and simultaneously with extracting the timing, are down-sampled so as to extract only to the sample at the symbol center time.

Figure 6A:
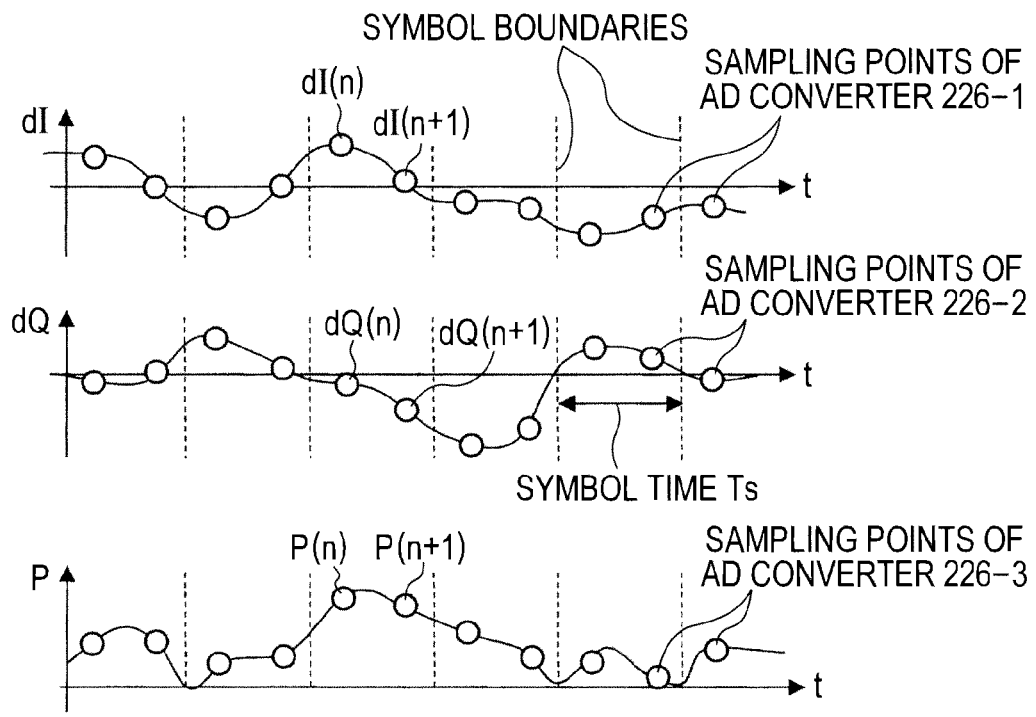
FIG. 6 shows drawings for describing the sampling timing of the received electrical signal (A) and regenerated electric field signal (B) in the first embodiment.
Figure 6B:
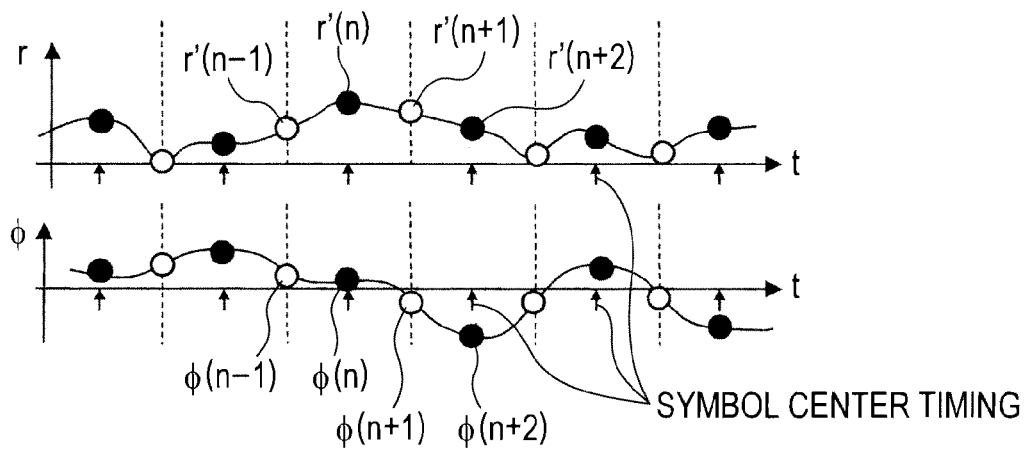

FIG. 6 is drawings for describing the sampling timing states of the received electrical signal ((A) in FIG. 6) and regenerated electric field signal ((B) in FIG. 6) in the first embodiment. (A) in FIG. 6 shows the dI, dQ, P signals sampled by the AD converters 226-1, 226-2, 226-3 and the positional relation of the their sampling points (white circles). The dot lines are the symbol boundaries, and the three AD converters mutually perform AD conversion of the input waveforms and output them as the digital data at the same timing (white circle times) however this timing is not always synchronized with the symbol boundaries. In this example, the sampling frequency shown in the drawing as exactly twice the symbol speed but somewhat of a deviation is allowable. The sampling speed of the A/D converter can basically be retimed at an optional time satisfying the Nyquist theorem if at least twice or more than the input signal frequency band. As long as this condition is satisfied, the sampling frequency can be lowered to twice the symbol speed (2/Ts).

The above digital data is input to the retiming & down-sampling circuits 301-1, 301-2, and 301-3 which internally extract the transition timing of each waveform and that reduce the sampling speed so that the sampling timing reaches the center time of each symbol. These types of digital clock extraction circuits are widely utilized in digital wireless signal processing, and any algorithm can be utilized as long as the same functions are provided. This type of processing can be achieved for example by first of all separating a portion of the input digital signal, finding the absolute value of the portion and implementing high-speed Fourier transform (FFT) to convert that absolute value to a frequency region, extracting a clock component identical to the symbol speed, implementing inverse Fourier transform after shifting the phase of each frequency component by just an amount equal to the phase shift of the clock component, and extracting just the odd (or even) numbered symbol center time sampling points (black circles). Moreover, this clock extraction processing need not always be performed separately for each of the retiming & down-sampling circuits 301-1, 301-2, 301-3 and if the three signal paths are all set to the same length then the phase shift & down-sampling processing may be performed based on a common clock phase extracted by one circuit.

Noted here is that the now retimed dI component & dQ components in FIG. 5 are input to the inverse tangent processing circuit 227 to calculate the differential phase Δϕ(n). The above described retiming & down-sampling processing is implemented in order to make the sample time that was input match with the symbol center of the multilevel signal so that a zero hit is unlikely to occur compared to the above described third technical example. The differential phase Δϕ(n) is afterwards input to the phase integration circuit 302, integrated one time for each symbol (time period Ts), and the absolute phase ϕ(n) is calculated.

The intensity component on the other hand output from the retiming & down-sampling circuit 301-3, is input to the square root circuit 228 and converted to an amplitude component. If there is optical noise contamination or a fluctuation in the DC level then the square may be calculated after correcting as needed for the direct current offset. The absolute phase component ϕ(n) and the amplitude component r(n) ((B) in FIG. 6) obtained as shown above are input to the quadrature coordinate converter circuit 229, converted from polar coordinates to quadrature (orthogonal) coordinates, and the optical electric field then regenerated. This regenerated optical electric field is a digital signal containing the same phase component ϕ(n) and amplitude component r(n) as the received signal at a sampling period Ts (same as symbol speed). In this example, an inverse function of the wavelength dispersion on the transmission path is applied to the regenerated electric field signal by way of the electric field compensation circuit 231 at a compensation period T to compensate for linear degradation, and after differential detection of just the phase components in the multilevel signal by the electric phase differential detection circuit 232, and multilevel decision processing is implemented to obtain the digital information signal 230.

In the present embodiment linear degradation on the transmission path can be compensated the same as the coherent optical receiver as already described. However, the sampling speed of the optical electric field falls to the same symbol speed Ts at the compensation point so that compensation capability is limited. More specifically, components within ±1/(2T) among the frequency band of the optical electric field signal can be compensated.

Figure 7A:
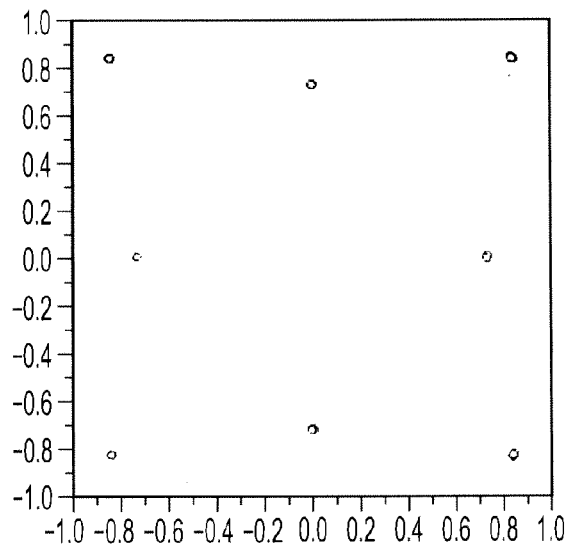
FIG. 7 shows examples for calculating: (A) the signal point placement prior to fiber transmission (wavelength dispersion Ops/nm) of the 10 G symbol per second 8 QAM signal; (B) signal point placement after SMF60 km transmission (wavelength dispersion 680 ps/nm): (C) signal point placement after SMF 120 km transmission (wavelength dispersion 1360 ps/nm) in the optical multilevel receiver utilizing direct detection of the related art.
Figure 7B:
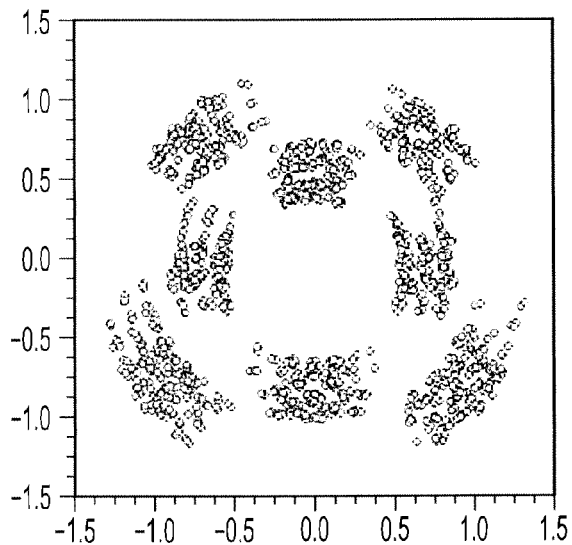
Figure 7C:
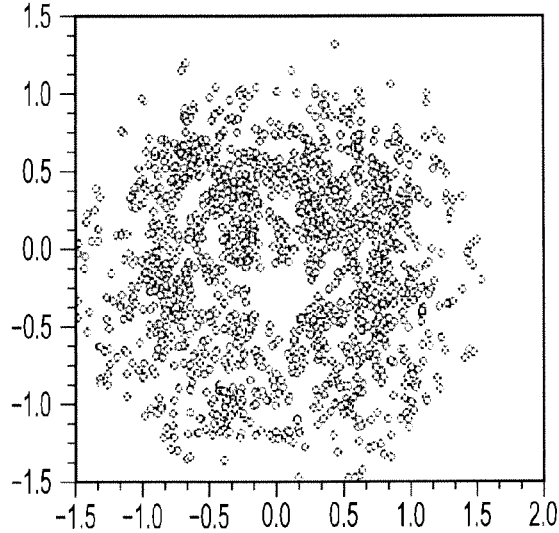

A satisfactory compensation effect for linear degradation can be obtained during optical fiber transmission of multi-level signals even with the above type of limited compensation capability. (A) and (B) in FIG. 7 are drawings showing the signal point placement prior to fiber transmission ((A) in FIG. 7), and signal point placement after SMF60 km transmission ((B) in FIG. 7) when the optical multilevel receiver utilizing direct detection of the related art received a 10 G symbol per second 8 QAM signal. (C) in FIG. 7 is described later on. The present example utilizes the second technical example showing modulation/demodulation by 8 QAM modulation as an 8-level multilevel modulation signal employing phase pre-integration technology. This example calculates the state of the regenerated optical electric field by using numerical simulation and assuming no effects from optical noise. Though the method of the second technical example completely reproduces an 8 QAM signal having eight signal points as shown in FIG. 7A with no wavelength dispersion, which is one form of linear degradation on the transmission path; in the case of (B) in FIG. 7 where wavelength dispersion at 680 ps/nm was applied in a 60 kilometer transmission on a normal dispersion fiber (SMF), the signal point distribution has widely broadened and the placement has greatly changed relative to the original signal point placement in FIG. 7A. Consequently discriminating one signal point from another is difficult and the transmission is susceptible to noise, and large degradation in the transmission occurs.

Figure 8A:
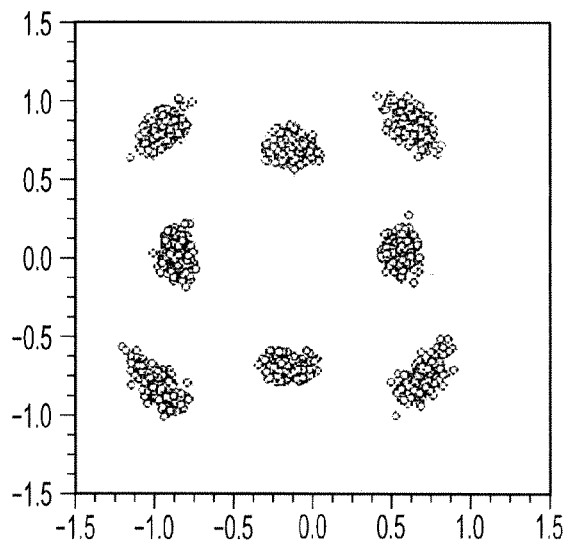
FIG. 8 shows examples of: (A) signal point placement after SMF60 km transmission of 10 G symbol per second 8 QAM signal+including dispersion compensation; (B) signal point placement after SMF60 km transmission+during dispersion compensation+during offset compensation; (C) signal point placement after SMF60 km transmission+during narrowed bandwidth+during dispersion compensation, in the optical multilevel electric field receiver of the present invention.
Figure 8B:
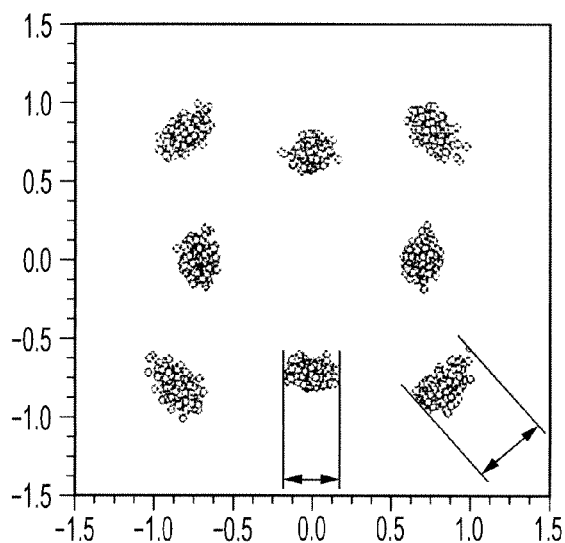
Figure 8C:
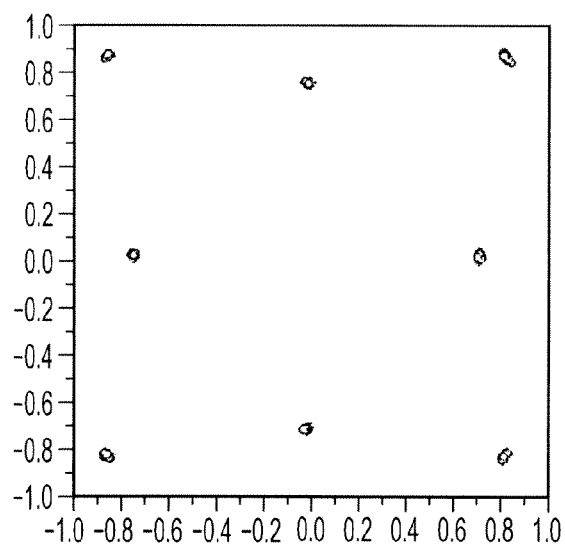

(A) in FIG. 8 on the other hand, is the signal point placement utilizing the optical electric field receiver of the present embodiment having dispersion compensation applied after SMF60 km transmission. This example utilizes the structure of the present embodiment shown in FIG. 5, and utilizes digital signal processing to perform wavelength dispersion compensation by applying a −680 ps/nm wavelength dispersion having an inverse sign in an electric field compensation circuit 231 at a compensation period T. The received signal is consequently greatly improved from that in (B) of FIG. 7 and the eight signal points can be observed as clearly separated. Even so, the distribution of each signal point has vastly broadened compared to FIG. 7A but this is considered due to incomplete compensation caused by a compensation frequency band limited to ±1/(2T) as already described.

When utilizing the phase integration circuit 302 within a receiver to regenerate an optical electric field as in the present example, the initial phase of the integration is indefinite, and thermal noise or error within each detector may accumulate and sometimes cause excessive phase error. In contrast, in the present example the inverse propagation function for compensating for wavelength dispersion on the transmission path in the electric field compensation circuit 231 is not dependent on the initial phase of the electric field signal. In cases where there is relatively little compensation for wavelength dispersion, the cumulative errors are minimal since only effects from adjacent or nearby symbols are received so compensation can be performed without problems.

This type of increase in phase jitter or uncertainty in the initial phase also makes subsequent detection of signal levels difficult but in the present example these effects can be avoided by multilevel decision processing after differential detection just the phase components of the multilevel signal based on the immediately prior symbol using the electric phase differential detection & decision circuit 232. Namely, the phase integration circuit 302 integrates just the phase component for each symbol so that the original multilevel signal can be restored by again performing differential processing of just the phase components after electric field compensation. The method for demodulating the multilevel signals is not limited to this method, and multilevel decisions may be made after eliminating the phase jitter as describer later, or performing MLSE (maximum likelihood sequence estimation) and so on. Methods that detect various large phase jitter signals as already disclosed may also be employed.

Basically, performing just wavelength dispersion compensation in the electrical field compensation circuit 231 allows equalizing when there is linear transmission degradation and can for example compensate for coding interference in optical modulators/demodulators, polarization wave mode dispersion on the transmission path, and band degradation due to the optical filters and electrical filters. A portion (of the field) may prove impossible to compensate when the phase is indefinite but can in fact be compensated by applying compensation along with phase jitter removal processing described later on.

In the above described third technical example, the electric field compensation circuit 1250 operates at compensation period T/2, and the circuit scale implemented in the configuration of this embodiment operating at compensation time period T is small.

Figure 9A:
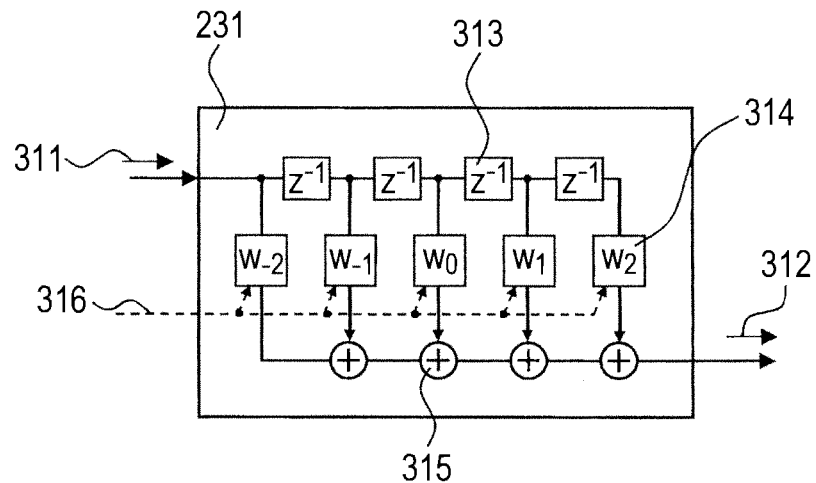
FIG. 9 shows examples of the (A) electric field compensation circuit (FIR filter), and electric field compensation circuit (look-up table) (B).
Figure 9B:
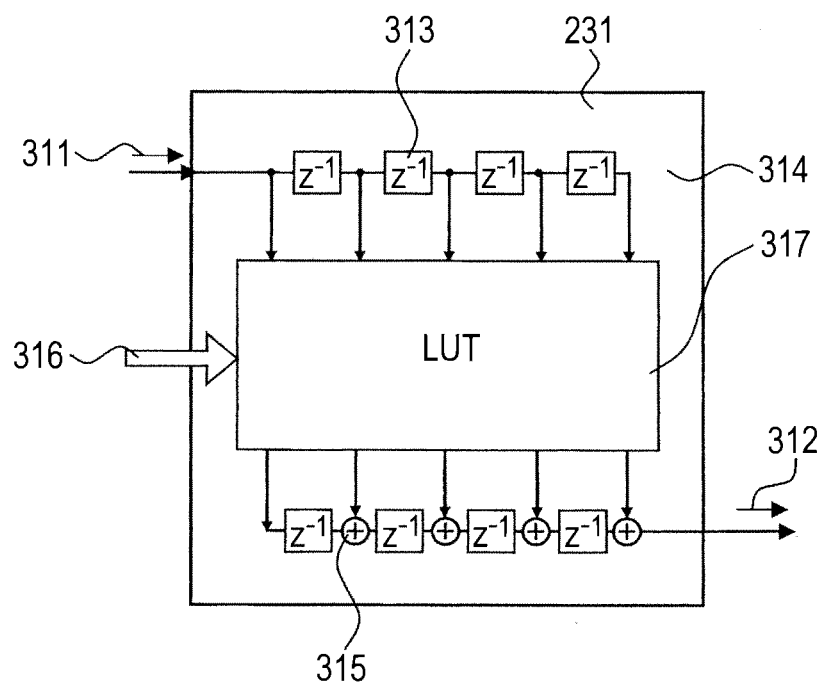
Figure 10A:
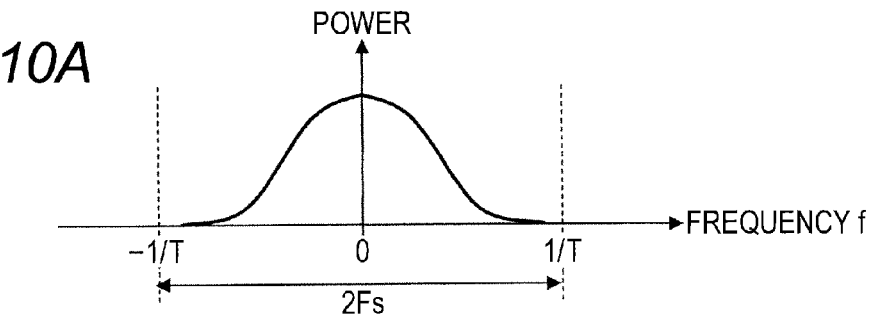
FIG. 10 describes the spectrum (A) of the received optical electric field; the spectrum (B) of the differential optical electric field for one sample/symbol; the spectrum (C) of the regenerated optical electric field of one sample/symbol; and the spectrum (D) of the regenerated optical electric field after expansion of the band; of the present invention.
Figure 10B:
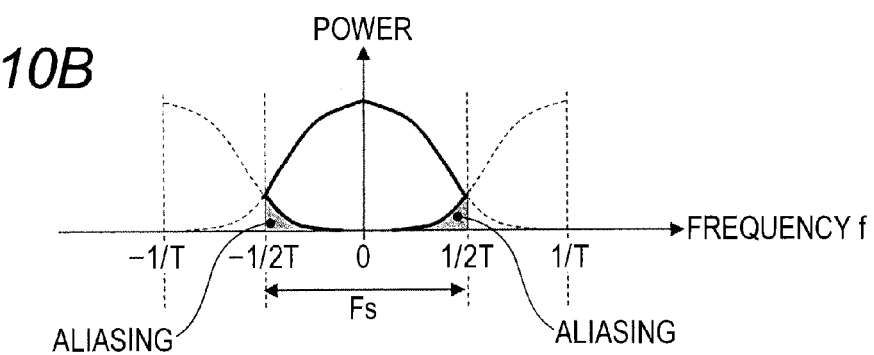
Figure 10C:
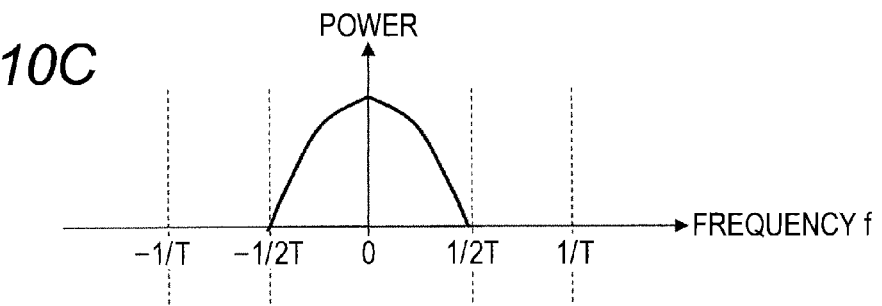
Figure 10D:
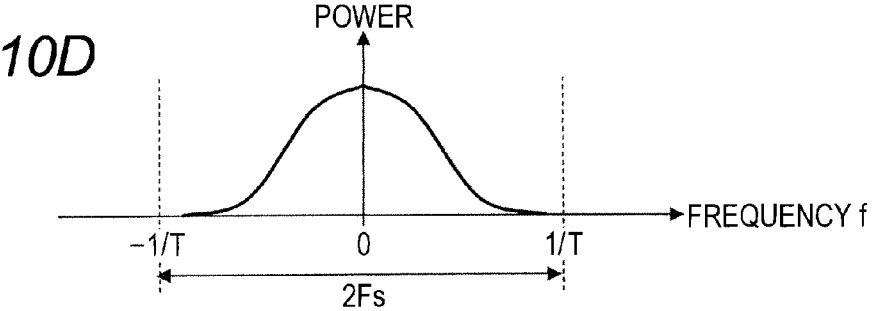

FIG. 9 shows examples of the electric field compensation circuit 231 of the present embodiment, and shows working examples of the FIR filter((A) in FIG. 9) and the look-up table ((B) in FIG. 9). In (A) of FIG. 9, the input complex electric field signal string 311 input to the electric field compensation circuit 231 is a complex digital signal containing one sampling point for each symbol. The electric field compensation circuit 231 in FIG. 9 contains a delay circuit 313 that holds the delay time for each symbol and a complex tap multiplier circuit 314 and complex adder circuit 315 that are configured as a ladder filter. Each sample delayed at each sample time is multiplied by a tap weight wi, summed and successively calculated as the output complex electric field signal string 312 and output to an external section. The weight of each complex tap is a value calculated beforehand (or accumulated in a table) in an external section according to the amount of compensation or physical quantity for compensation, and can be set to an optional figure by the compensation data setting signal 316.

In the structure in (B) of FIG. 9, the input complex electric field signal string 311 successively delayed at each sample is input to the electric field compensation lookup table 317, is shifted by one sample time each in the complex adder circuit 315, added and is combined into an output signal. In this configuration, compensation for nonlinear effects can also be performed by sections. The lookup table 317 for example uses the complex electric field signal string as a key to express the electric field waveform after dispersion compensation. Moreover the just previously placed quadrature (orthogonal) coordinate converter circuit 229 in FIG. 5 may be omitted. In that case, an electric field signal $\phi(n)$ and $r(n)$ for the polar coordinate are input to the electric field compensation lookup table 317, and the lookup table utilizes these signals as a key to express the electric field waveform after dispersion compensation.

If again performing differential phase detection immediately after this circuit as in the example in FIG. 5, the electric field waveform of the polar coordinate may be expressed in the electric field compensation lookup table 317, or the waveform expressed after differential detection. By summarizing and including the arithmetical processing such as for pre/post coordinate conversion and differential detection in this way as functions in a lookup table allows drastically reducing the circuit scale.

(A) and (B) in FIG. 10 are drawings for describing the spectrum of the received optical electric field ((A) in FIG. 10), and the spectrum of the differential optical electric field for one sample/symbol ((B) in FIG. 10). (C) and (D) in FIG. 10 are described later. The received optical multilevel electric field for the symbol period T generally contains a frequency spectrum extending to a maximum±Fs=±1/T as shown in (A) of FIG. 10, but the major portion of the energy is concentrated in the ±1/(2T) range. The sampling speed of the signal is therefore reduced at each sampling/symbol so that the compensation effect for linear degradation can be largely obtained even if utilizing the electric field compensation circuit 231 at a compensation period T. However, lowering the sampling speed in this way, causes equalized overlapping sampling (causes aliasing) on the inclined section of the signal energy ((B) in FIG. 10) protruding from the ±1/(2T) range so that full correction becomes impossible. This situation is the cause of degradation shown in (A) of FIG. 8.

The optical front end in the present embodiment is shown as including the two optical delay detection receivers 223-1, 223-2 and one optical intensity receiver 225, however if the required differential phase and intensity (or amplitude) for the optical signal can be provided then the structure is not limited to that described here. A structure may be utilized where the optical intensity receiver is omitted as shown in the third technical example and the amplitude component is estimated from the output signal of two optical delay detection receivers may be utilized. Moreover a multi-phase configuration such as a 3-phase structure utilizing three optical delay detection receivers with mutually different phases at 120 degrees among the optical delay detectors may be used where the quadrature components dI and dQ are calculated by coordinate conversion from the multiphase signal that were output. Moreover, a structure may be utilized where the directions of the quadrature components dI and dQ axes can be set as needed, and as long as these are mutually intersecting axes, can be offset±45 degrees along the direction of rotation. However in this case, a phase rotation of 0 degrees during phase integration is the dI axis direction so that correction processing of the integration quantity is required.

The present embodiment utilizes the optical delay detector and so the operation is not dependent on the polarized wave state of the incoming light. Unlike the coherent detection schemes of the related art, no local emission light source is required so a simplified design can be used for the receiver. Also, non-coherent multilevel optical receivers of the related art utilize optical delay detectors and optical phase integrators with an optical delay of Ts/2 (Ts is the symbol time) so that the electric field intensity is zero making zero hits likely to occur. The proposed structure however uses a delay and a phase integration period that are equivalent to the symbol time Ts so that the zero-hit probability is vastly decreased, and usability can be improved.

The circuits required for signal processing such as simultaneous waveform correction can utilize the same minimal circuit scale and operating speed as the symbol length. The circuit scale required for wavelength dispersion compensation in particular has been reduced to one-fourth of that of the related art.

The present embodiment can in particular extract the symbol center time data by way of the retiming & down-sampling circuit by utilizing digital signal processing to extract data for the center time. The present embodiment can also boost the regenerating accuracy of the electric field waveform by processing including integrating and calculating the differential phase limited only to the data for the symbol center time, and also lowers the probability that zero hits will occur and so renders the effect of improving phase integration and electric field compensation.

Second Embodiment

Figure 11:
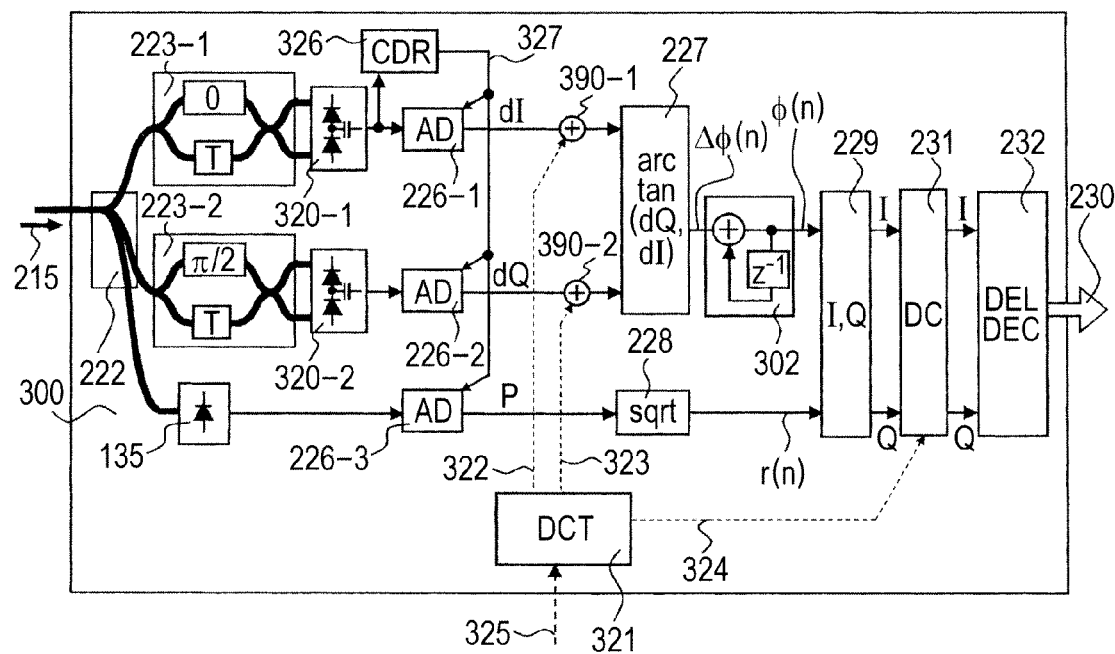
FIG. 11 is a block diagram showing the second embodiment of the optical electric field receiver of the present invention.

FIG. 11 is a block diagram showing the second embodiment of the optical electric field receiver of the present invention, and showing an example in particular performing clock extraction and offset compensation. Hereafter, structures identical to the above described embodiment are given the same reference numerals and a description is omitted. A clock extractor circuit 326 is utilized as substitute technology for the retiming & down-sampling circuit 301 of the first embodiment, and a portion of the received electrical signal dI is branched off and input. The clock extractor circuit 326 internally extracts a clock signal synchronized by way of rectification and the symbol timing (repeating sine wave) and outputs that signal, the signal is then branched and utilized as a sampling clock 327 for each of the AD converters 226-1 through 3. The AD converters 226-1 through 3 can in this way perform A/D conversion at the symbol center times of the input multilevel signal, and can output a digital signal having the same period (Ts) as the symbol speed. Consequently, the data speed of the A/D converters 226-1 through 3 can be lowered by half and along with boosting operability from the viewpoint of the circuit speed and scale, the digital retiming & down-sampling circuit 301 can be omitted.

The present example of the embodiment includes an internal direct current block circuit, and detects the optical multilevel signal via a direct current (component) removal type balance receivers 320-1, 320-2 having enhanced high frequency characteristics. Most commercially sold RF balance receivers utilize direct current removal type designs having an internal DC block as in the present example. The usage of this type of component represents no problem whatsoever when receiving balanced signals without degradation such as shown in FIG. 7A. However, signal degradation due to wavelength dispersion along the transmission path for example might be asymmetric as shown in (B) of FIG. 7 (in this example the top and bottom are asymmetric, in other words, asymmetric relative to the dQ direction on the vertical axis). When asymmetry occurs in this way in two-dimensional placement in the received optical electric field, an error occurs during the measurement of the differential phase by the inverse tangent circuit immediately after receiving the signals and the accuracy of the wavelength dispersion compensation deteriorates. FIG. 11 shows an example using offset compensation technology to prevent this type of error from occurring.

A wavelength dispersion quantity setter signal 325 is input to the dispersion compensation quantity setter circuit 321. The electric field compensation circuit 231 at compensation period T, generates a wavelength dispersion compensation data 324 to hold the desired wavelength dispersion characteristics, and fulfills the task of rewriting the contents of the lookup table and tap quantity of the FIR filter within the electric field compensation circuit 231. The dispersion compensation setter circuit 321 in the present example generates an offset compensation signal 322 for the dI component, and an offset compensation signal 323 for the dQ component according to the internal compensation quantity for wavelength dispersion, and by digitally summing these (offset) signals to dI and dQ signals after the AD conversion by the adders 390-1, 390-2, corrects for lost direct current offset components.

Figure 12:
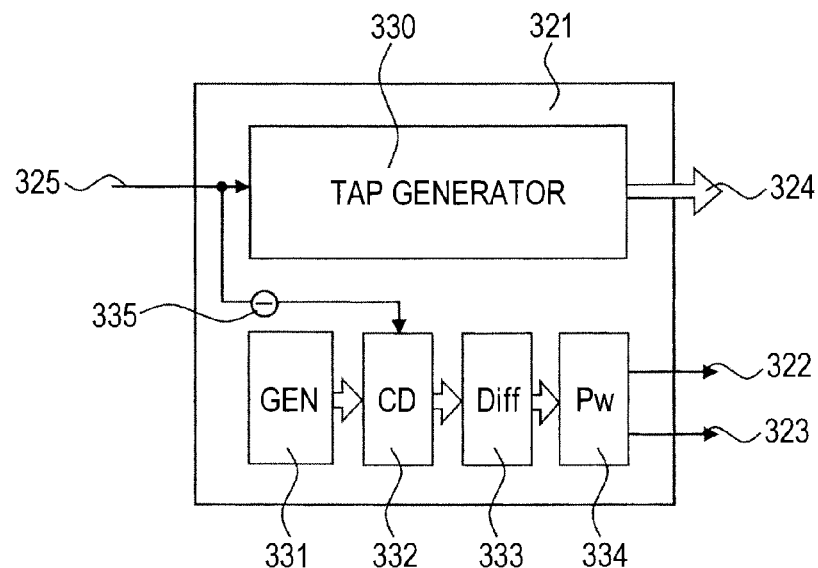
FIG. 12 is an example of the structure of a dispersion compensation table for the second embodiment of the present invention.

FIG. 12 is a block diagram of the dispersion compensation quantity setter circuit 321. A wavelength dispersion quantity setter signal 325 is branched into two branches in the dispersion compensation setter circuit 321. One branch is input to the tap generator 330 to generate a tap coefficient for generating a specified quantity of wavelength dispersion, and outputs this tap coefficient as the wavelength dispersion compensation data setting signal 324. This type of tap coefficient calculation is for calculating the impulse response of already known optical fiber wavelength dispersion characteristics and is easily achieved by numeric calculations utilizing a CPU or similar device. The structure of this section is the same even if not utilizing offset compensation.

The other wavelength dispersion quantity setter signal 325 utilized for generating propagation characteristics for wavelength dispersion within the wavelength dispersion simulator circuit 332, first of all inverts the code by using the inverter circuit 335. A waveform for a relatively short period (approximately a few dozen to several thousand symbols) generated by the multilevel waveform degradation waveform is applied to this circuit that this input waveform is applied to the wavelength dispersion is calculated and output. A waveform for a relatively short period (approximately a few dozen to several thousand symbols) generated by the multilevel waveform generator circuit 331 is input to this circuit, and a degradation waveform for wavelength dispersion applied to the input waveform is calculated and output. A delay detector simulator circuit 333 then receives this signal via delay detection, calculates the direct current components of the dI component and dQ signal generated in the average intensity calculation circuit 334, and outputs these (DC components) as the offset compensation signal 322 for the dI component and the offset compensation signal 323 for dQ component to the external section. These offset compensation signals are calculated by using a simulation to calculate the direct current offset quantity occurring during receiving of the direct detection of the multilevel signal that applied the specified amount of wavelength dispersion and may for example be achieved by a simple software optical transmission simulator. Moreover, a simple structure that stores the offset compensation quantity for each wavelength dispersion value ahead of time, and stores this quantity within the memory and output can be achieved without problems.

(B) in FIG. 8 shows simulation results by using numerical calculation to simulate effects from direct current offset compensation in the wavelength dispersion compensation of the present invention. The variations among signal points are slightly reduced compared to the case in (A) of FIG. 8 not using offset compensation, these results can lower the transmission error rate, and enhance the transmission quality.

The above embodiment described compensating for the offset error of the dI or the dQ component generated during compensation for wavelength dispersion. However if the main factor(cause) of the direct current error is known in advance then other degradation factor or P component offset errors may also be compensated. These types of error factors can be considered for various circumstances such as loss of received average intensity due to direct current removal of the P component, increase in the P component due to degradation in the previously described optical SN ratio, or the case when utilizing left/right or top/bottom asymmetrical signal point placement (e.g. 6-level phase modulation, etc.). Whatever the case, the embodiment can achieve offset compensation by methods including by storing correction quantities for direct current offset in tables and so on in advance by finding correction quantities by calculation, or by applying adaptive compensation by making decision errors for the received signal or feedback of the error rate so that the error becomes minimal.

The above compensation such as direct current offset may be implemented after regenerating the optical electric field. In this case, the direct current offset adder circuit is placed at the point where the original optical electric field is regenerated or namely downstream of the phase integration circuit 302 and the quadrature coordinate converter circuit 229. A direct current offset may then be adaptively added to each IQ component of the quadrature coordinates so as to minimize the error rate or jitter in the regenerated electric field amplitude. In this way, deviations in the direct current offset of the original optical electric field such as deviations in operation points of the optical electric field modulator 211 on the transmitting side can also be compensated.

The present embodiment can boost the regenerating accuracy of the electric field waveform by processing including integrating and calculating the differential phase limited only to the data for the symbol center time by providing a clock extraction circuit to extract data for the symbol center time, and also can lower the probability that zero hits will occur and so can render the effect of improving phase integration and electric field compensation.

The embodiment is also capable of enhancing the wavelength dispersion compensation effect by compensating for offset signals lost during the wavelength dispersion compensation.

Third Embodiment

Figure 13:
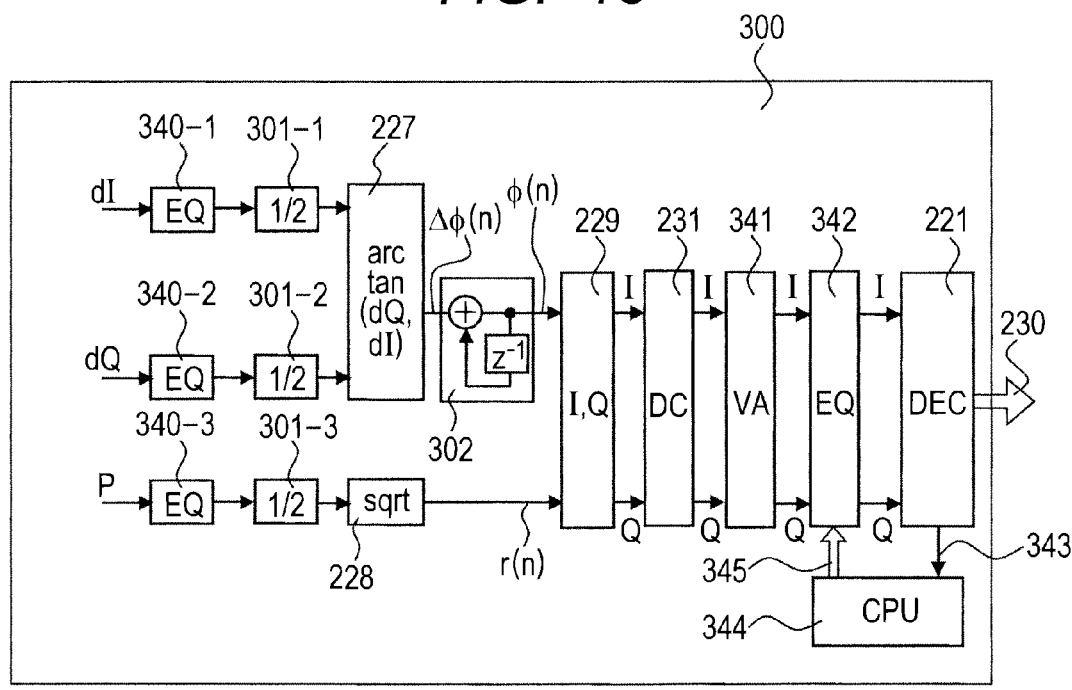
FIG. 13 is a block diagram showing the third embodiment of the optical electric field receiver of the present invention.

FIG. 13 is a block diagram showing the third embodiment of the present invention. Compared to the corresponding FIG. 5 and FIG. 11, in this figure the optical receiver front end unit and the AD converter unit are omitted. All other parts of the structure are identical to FIG. 5 and FIG. 11. The structure of the present embodiment performs response characteristic equalization of the front end section, removal of phase jitter from the regenerated optical electric field signal, adaptive equalizing of the regenerated optical electric field signal or non-delay detection in particular by digital signal processing.

Each of the dI, dQ, P signals in digital format in the two sample/symbols obtained from each of the AD converters 226-1 through 3 in the above structure are in the present embodiment first of all input to the front end equalizer circuits 340-1, 340-2, and 340-3 where mainly the waveform distortion caused due to band degradation in the optical detector or AD converters and so on is removed. This equalizer circuit can be achieved by an adaptive equalizing FIR filter or FIR filter with pre-fixed tap coefficients. This type of equalizing circuit renders the most effective compensation of waveform degradation on input digital signals for two samples/symbols satisfying Nyquist conditions but can still provide a compensation effect for waveform degradation even when that condition is not met.

The sampling point for each of signals is next shifted to the center of the waveform and then down-sampled per one sample/symbol by the retiming & down-sampling circuits 301-1, 301-2, and 301-3 and are then output. The differential phase electric field signal $\Delta\phi(n)$ and amplitude $r(n)$ are calculated from these signals, and after integration of the phase component in the phase integration circuit 302, the quadrature (orthogonal) conversion is performed in the quadratic coordinate converter circuit 229 and linear degradation such as wavelength degradation is compensated in the electric field compensation circuit 231 at compensation period T.

A phase jitter removal circuit 341 is designed for high sensitivity and cancels out phase jitter in an integrated phase component $\phi(n)$. The various cause of phase jitter in the phase component $\phi(n)$ may include oscillation phase jitter components from the light source itself, components causing optical noise and superimposed during the transmission, components caused by a non-linear effects occurring during optical fiber transmission, components by incomplete optical delay detector operation or thermal noise in the receiver or shot noise, etc. A portion of these components and in particular components caused by optical noise that tend to easily occur when using short and dominant time constants can be corrected by reducing the phase noise through averaging, and the detection accuracy and receiving sensitivity can in this way be improved. Operation algorithms for the phase jitter removal circuit 341 can be applied largely unchanged to processing for removal of phase jitter in wireless (radio) multilevel receivers or coherent optical multilevel receivers. For example when using phase multilevel signals having an N value as the multilevel signal, a usable method is the accumulation method (or Viterbi algorithm or Viterbi methods) in which the phase jitter component is extracted by dividing the phase component obtained by removing the phase modulation component from the complex N-th powered input signal by N, and the extracted phase jitter component is averaged and then output. If the multilevel signal includes amplitude modulation (components) then methods such as decision-directed methods can be applied to detect phase fluctuations from phase deviations when making multilevel judgments, and average and remove the detected phase fluctuations.

Residual linear errors can then afterwards be removed from the received signal by an adaptive equalizing circuit 342 and later converted to a digital information signal 230 in the multilevel judgment circuit 221. In the present embodiment, since the phase of the regenerated optical electric field is maintained at a fixed level by the phase jitter removal circuit 341, the multilevel judgment circuit 221 is capable of multilevel decision processing without having to utilize an electric delay detector such as in the coherent optical receiver of the first technical example. In this case, there is no need to utilize phase pre-integration processing such as in the second technical example. However, even phase jitter removal by the phase jitter removal circuit 341 still has the problem that the initial phase is indefinite basically and also the problem that the orientation of the original multilevel signal cannot be restored incases where sudden phase fluctuations have caused a phase shift. This type of indefinite phase problem is the same as the coherent optical receiver of the first technical example, and countermeasures such as performing logical differential detection via differential coding on the transmitting side, or embedding marker signals for intermittently identifying the correct position of the multilevel signal in order to make a decision and so on can be jointly utilized. The differential coding and differential detection as referred to here is simply a logical encoding process for setting multilevel signals to an unvarying state in the rotational processing. In contrast, the above described phase pre-integration processing or the differential detection processing utilized in the electric phase differential detection-decision circuit 232 is digital numeric processing and so is different from the differential coding and differential detection.

An error signal 343 obtained from the multilevel judgment circuit 221 is input into the compensation quantity calculation circuit 344, and the adaptive equalizing circuit 342 performs optimization of this signal. Here, the error signal 343 signifies for example the deviation between the actual signal and the ideal signal. Compensation algorithms and structures identical to the adaptive digital filter utilized in digital communication in the related art can also be utilized in this way in the adaptive equalizing circuit 342 and its adaptive compensation unit (compensation quantity calculation circuit 344). The compensation quantity calculation circuit 344 can for example calculate the correction quantity for the tap coefficient from the error signal by utilizing an algorithm such as the least mean squares (LMS) method. Methods such as decision feedback or blind equalization may be utilized as needed. Instead of minimizing the error signal, optimizing processes may be utilized that maximize the eye opening, or that minimize the clock frequency component. Signal degradation where these type of adaptive equalizing circuits can be used for compensation include polarization wave mode dispersion and wavelength dispersion, intersymbol interference (ISI) in transceivers and signal point position deviations, etc.

The example described in the present embodiment utilized an adaptive equalizer mounted just upstream of the decision circuit but other methods may include changing the placement position, or using adaptive equalization in other compensation circuits (front end equalizer circuits 340 or electric field compensation circuit 231, phase jitter removal circuit 341.)

The present embodiment showed a structure utilizing phase averaging after phase integration but if using phase noise average for differential signals such as MSPE (multiple symbol phase estimation) then phase averaging may be implemented prior to phase integration. Furthermore, processing such as for phase noise removal methods, noise equalization, or adaptive equalization need not be implemented in the above sequence and phase jitter is nonlinear distortion so performing this processing prior to wavelength dispersion compensation will in some cases improve the compensation accuracy.

The present embodiment renders the effect of boosting sensitivity to optical multilevel signals and extending the transmission distance by providing a phase jitter removal circuit. Consequently the embodiment also provides the effect of alleviating the indefinite phase state so compensating for linear degradation due to intersymbol interference from the modulation device on the transmitting side and transmission degradation on the receiving side is possible by making use of methods such as adaptive equalization. If performing delayed detection then the embodiment renders the effect of achieving simple multilevel transmission without concern over phase deviations such as from indefinite phase states or cycle slip when receiving multilevel signals, etc.

Moreover, usage of adaptive equalization allows more precise compensation of linear distortion such as from dispersion or PMD, etc.

Fourth Embodiment

Figure 14:
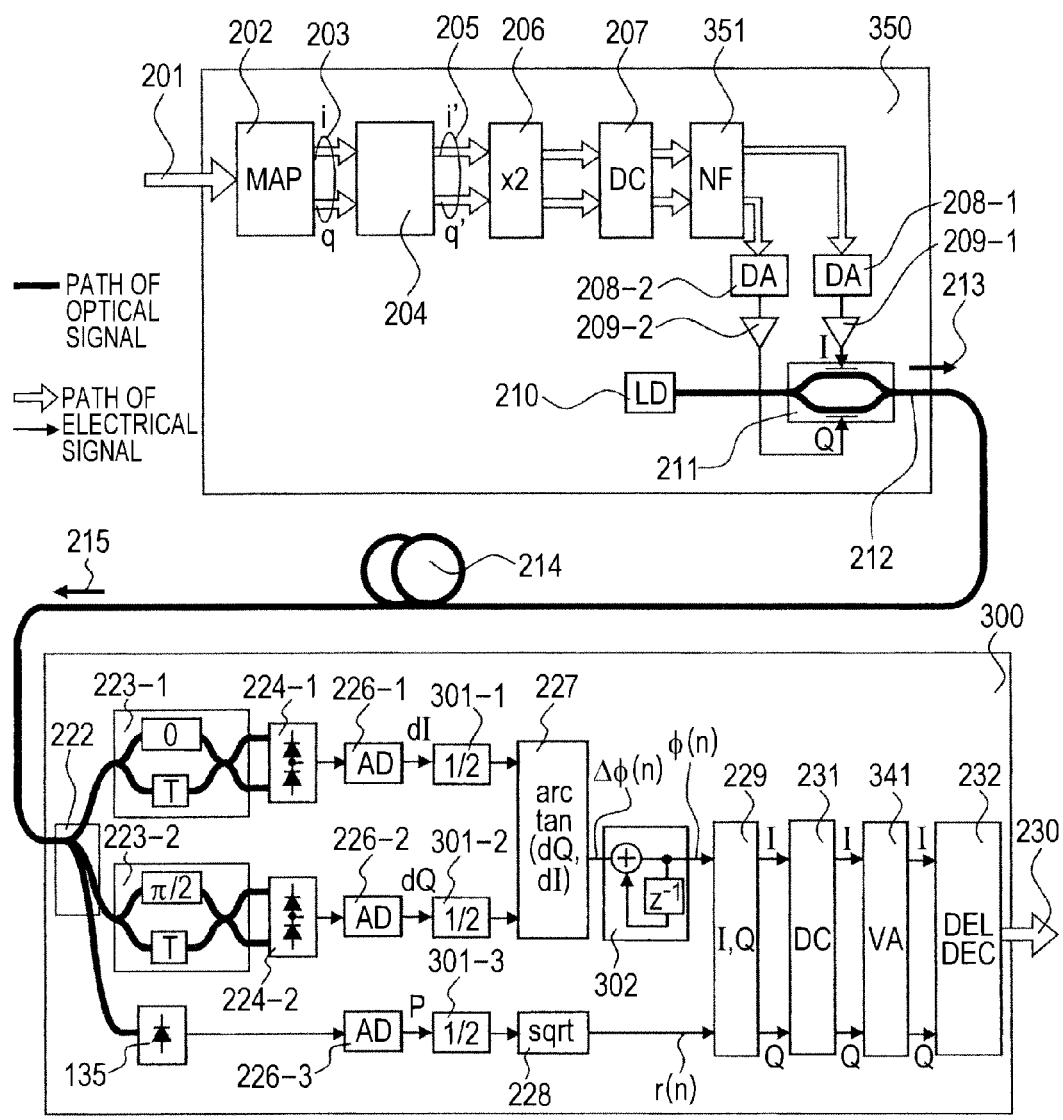
FIG. 14 is a block diagram showing the fourth embodiment of the optical transmission system of the present invention.

FIG. 14 is a block diagram showing the fourth embodiment of the present invention. This figure shows a first configuration example of the optical transmission system of the present invention. The present embodiment performs digital processing for narrowing the signal band, phase pre-integration, wavelength dispersion pre-equalizing on the transmission side, and performing electric differential phase detection after performing phase jitter removal on the receiving side.

The optical electric field transmitter 350 of the present embodiment first of all inputs the digital information signal 201 that was input into the multilevel encoder circuit 202 for conversion to optical multilevel electric field signals. The converted multilevel electric field signals are input to the phase pre-integration unit 204, and just the phase sections of each signal are integrated. Eventually, after up-sampling increased two-fold in the sampling speed converter circuit 206, an inverse function of the propagation characteristics of transmission path (e.g. wavelength dispersion) is applied in the pre-equalizer 207, to pre-equalize the waveform. Also in this embodiment, after the Nyquist narrow-bandwidth filter 351 narrows the signal band in advance so that the signal band spectrum approaches a Nyquist band±1/(2Ts); the DA converters 208-1, 208-2, and the optical electric field modulator 211 generate an optical electric field signal.

Among the above methods, phase pre-integration and wavelength dispersion pre-equalizing can utilize the transmission technology described in the second technical example of the present invention; and by usage in combination with direct detection multilevel transmission can achieve the effect of simplifying the complex multilevel signal long-distance optical fiber transmission. The delay detection receiver of the present embodiment internally compensates for effects from wavelength dispersion in the optical fiber 214 but there is an upper limit to the amount of compensation. As the wavelength dispersion applied to the 10 G symbol per second 8-level signal increases, broad variations for example occur in the optical signal as seen in (B) of FIG. 7, and the signal point placement ultimately widens and approaches the origin point as shown in (C) of FIG. 7. When the signal points approach the origin point in this way, the previously described zero hits tend to occur and differential phase detection by optical delay detection sometimes cannot be carried out correctly.

A structure for practical long-distance optical fiber transmission exceeding the above described limitations can be achieved in this embodiment by equalizing wavelength dispersion on the transmitting side to compensate for large wavelength dispersion and implementing digital dispersion compensation on the receiving side to compensate for residual quantities after optical fiber transmission. In other words, if using only pre-equalizing then the feedback time (distance) required for detecting wavelength dispersion compensation errors and changing the pre-equalizing quantities on the transmitting side becomes longer, the system becomes unstable, and the configuration is also complicated. However, by achieving wavelength dispersion compensation to a certain extent just on the receiving side in conjunction with the present embodiment, the usability can be improved without having to utilize a feedback structure on the transmitting side.

The range of dispersion compensation on the receiving side in this embodiment is ±60 kilometers or more (equivalent to (B) in FIG. 7) at for example a multilevel signal with a symbol rate of 10 G symbols at 30 Gbps. Even if the modulation speed is set to 33 Gbps in order to achieve a modulation speed of 100 Gbps, the compensation range will be a±6 kilometer width in terms of optical fiber length. This value is considerably larger than the measurement accuracy for the general optical fiber transmission path length, and shows that the amount of wavelength dispersion compensation quantity on the receiver side in this embodiment is sufficiently wide. The durability for withstanding wavelength dispersion if not utilizing this technology is approximately one-half to one-fourth of the above value which amounts to approximately ±2 kilometers. Measuring a transmission path length ranging for example from several hundred to several thousand kilometers is difficult at an accuracy of ±2 kilometers or less, and errors will occur to the same extent due to temperature fluctuations on the transmission path, etc. Utilizing the technology of the related art in such cases requires making frequent changes in pre-equalizing quantities on the transmitting side to match the environmental fluctuations so that achieving stable transmission is impossible.

Also, narrowing the band in this embodiment boosts the compensation effect of the electric field compensation circuit 231 at compensation period T. The optical delay detection receiver of the present embodiment only performs phase detection one time per symbols so that when the band containing the multilevel signals being received is broad, then aliasing occurs as shown in the previously described FIG. 10 (B), and the wavelength dispersion compensation accuracy decreases. To avoid this problem, the Nyquist narrow-bandwidth filter 351 narrows the signal band beforehand, and at the same time shapes the spectrum so that no intersymbol interference will occur. (C) in FIG. 10 shows the spectrum of the regenerated optical electric field of one sample/symbol when using the Nyquist narrow-bandwidth filter 351, and in which aliasing no longer occurs because the signal energy is trapped within the frequency range±1 (2T). (C) in FIG. 8 is an example of calculating the received signal in the case where using an ideal rectangular filter as an ideal Nyquist narrow-bandwidth filter 351. A nearly ideal dispersion compensation effect obtained by narrowing the band can be confirmed compared to (A) in FIG. 8.

Besides using a rectangular filter as the Nyquist narrow-bandwidth filter 351, a cosine rolloff filter and other may also be utilized, and if a certain extent of intersymbol interference is permissible then electrical low-pass filters such as Butterworth filters or elliptic filter are widely usable.

The Nyquist narrow-bandwidth filter 351 of the present embodiment was achieved by a two sample/symbol digital filter, however if boosting the frequency cutoff performance then a filter providing a high over-sampling rate can also be utilized. The filter can also be achieved in a high-speed analog circuit, in which case an electrical low-pass filter for a cutoff frequency of approximately 1/(2T) can be mounted in the output section of the DA converters 208-1 and 208-2.

Figure 16:
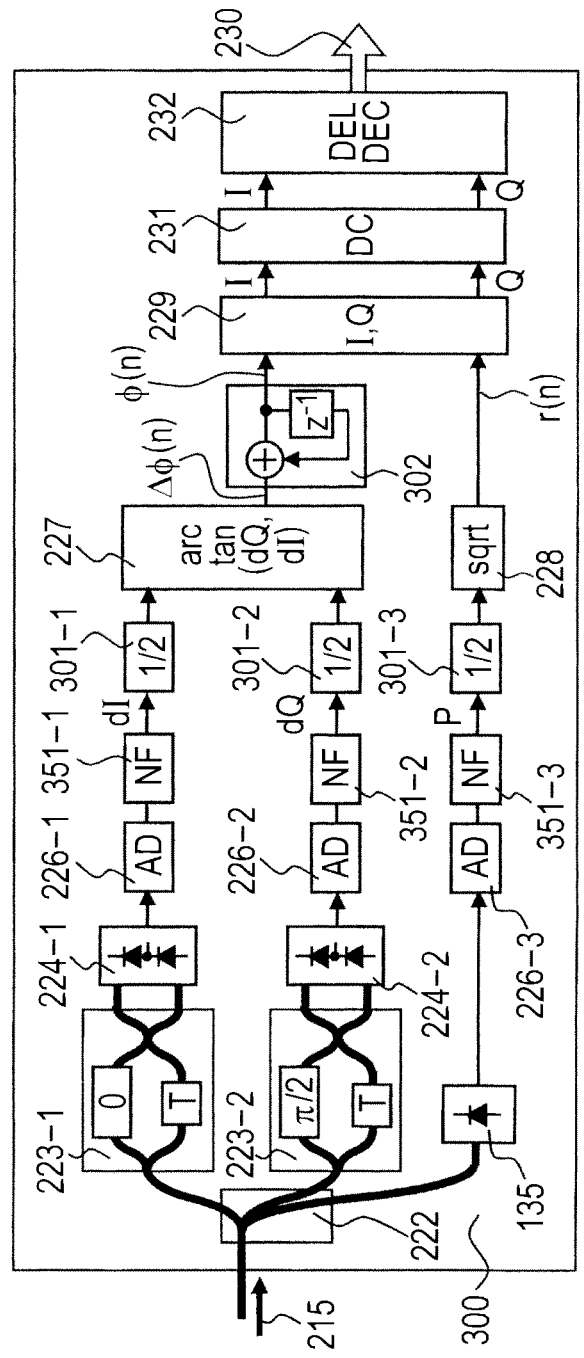
FIG. 16 is a block diagram of the optical receiver including the narrow-bandwidth pass filter.

FIG. 16 is a block diagram showing a configuration example of the optical receiver including the narrow-bandwidth pass filter. In the example in FIG. 14, the Nyquist narrow-bandwidth filter 351 was mounted on the transmitting side but may be mounted within the optical receiver 300, and for example may be mounted so that the output signals from the AD converter 226 are input to the Nyquist narrow-bandwidth filter 351 as shown in FIG. 16.

The present embodiment is capable of enhancing the dispersion compensation effect and preventing aliasing from occurring in the one sample/symbol processing within the receiver by the mounting of an electric narrow-bandwidth filter.

Fifth Embodiment

Figure 15:
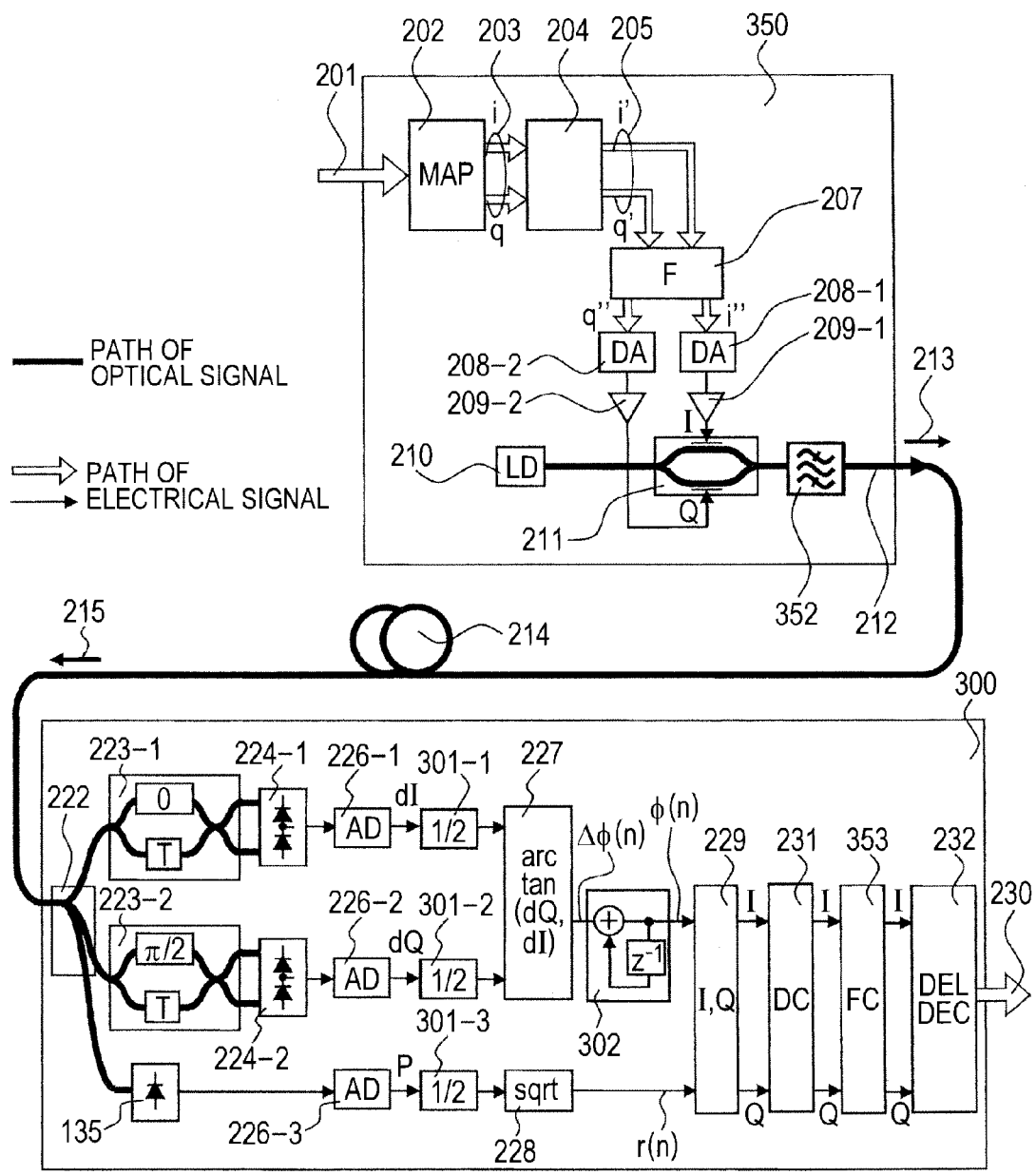
FIG. 15 is a block diagram showing the fifth embodiment of the optical transmission system of the present invention.

FIG. 15 is a block diagram showing the fifth embodiment of the present invention. This figure shows a second configuration example of the optical transmission system of the present invention. The present embodiment reduces the size of the electrical circuit and power consumption by lowering the digital signal processing speed on the transmitting side to one sample/symbol. The Nyquist narrow-bandwidth filter is achieved at the same time by the optical bandwidth bandwidth-narrowed filter 352, and a bandwidth compensation filter 353 is mounted just upstream of the electric phase differential detection-decision circuit 232 within the receiver.

Along with the above arrangement, a pre-equalizer circuit 207 is also a one sample/symbol compensation circuit and so the compensator has an inadequate frequency range that only provides a wavelength dispersion equalizing effect in the center section of the output optical spectrum signal. In the present embodiment, a narrow bandwidth signal equivalent to the Nyquist narrow-bandwidth filter 351 for the previously described electrical region can be obtained by utilizing the optical bandwidth-narrowed filter 352 to cut out that center spectrum.

The optical bandwidth-narrowed filter 352 is a linear filter and therefore has no limitations on the installation location, and can be inserted anywhere if between the optical modulator and optical receiver. The optical bandwidth-narrowed filter 352 may for example be inserted within the optical transmitter or within the optical receiver or along the optical fiber transmission path to narrow the band-pass of the optical signal. An electrical Nyquist narrow-bandwidth filter 351 may be mounted on the transmitting side such as in the previously described fourth embodiment or may be mounted as an electrical filter on the receiving side.

The bandwidth compensation filter 353 also reduces intersymbol interference that occurs due to effects from the optical bandwidth-narrowed filter 352. Essentially, an ideal Nyquist filter will generate no intersymbol interference, however optical filter have low manufacturing accuracy compared to electrical filters so that mounting a separate electrical correction filter will prove effective in suppressing intersymbol interference. Regenerating a smoother time waveform by performing over-sampling as needed for improving filter performance is also allowable. Smoothly expanding by two-fold sampling as shown by the signal band in (D) of FIG. 10, allow regenerating an optical electric signal the same as the original waveform of the optical spectrum in FIG. 10A.

The sampling speed on the transmitting side is not limited to one sample/symbol, and an intermediate speed value such as 1.3 sample/symbols may be utilized. Using an intermediate speed in this way has the advantage of maintaining an ideal signal band and waveform, and greatly suppresses the equalizing circuit scale and the operation speed of the DA converters.

The present embodiment is capable of boosting the dispersion compensating effect and preventing aliasing from occurring in the one sample/symbol processing within the receiver by the insertion of an optical bandwidth-narrowed filter.

INDUSTRIAL APPLICABILITY

The present invention is effective for compensating for transmission degradation and long-distance transmission of two-level modulation signals and multilevel modulation signals for example in optical communications.

LIST OF REFERENCE SIGNS

101: Input optical signal
102: Polarization wave splitter circuit
103: Local emission laser light source
104: Local emission light
105: S polarization component of optical multilevel signal
106: P polarization component of optical multilevel signal
107: Optical phase diversity circuit
108: I component output light
109: Q component output light
110: Balance type optical detector
111: A/D converter
112: Output electrical signal of A/D converter
113: Digital processor circuit
114: Optical electric field signal
115: Digital processor-decision circuit
116: Multilevel digital signal
200: Phase pre-integration optical electric field transmitter
201: Digital information signal
202: Multilevel encoder circuit
203: Complex multilevel information signal
204: Phase pre-integration unit
205: Phase pre-integration complex multilevel information signal
206: Sampling speed converter circuit
207: Pre-equalizer circuit
208: DA converter
209: Driver circuit
210: Laser light source
211: Optical electric field modulator
212: Output optical fiber
213: Transmit optical multilevel signal
214: Optical fiber transmission path
215: Receiving optical multilevel signal
220: Non-coherent optical electric field receiver
221: Multilevel decision circuit
222: Optical splitter
223: Optical delay detector circuit
224: Balance type optical receiver
225: Optical intensity receiver
226: AD converter
227: Inverse tangent processing circuit
228: Square root circuit
229: Orthogonal coordinate converter circuit
230: Digital information signal
231: Electric field compensation circuit at compensation period T
232: Electrical phase differential detection-decision circuit
240: Optical delay detector with delay T/2
241: Sampling block
242: Delay adjuster circuit
243: Optical received signal
244: Electric field processor
245: Square distance processing circuit
246: Delay adder circuit
247: Delay divider circuit
248: Processing result
249: Regenerated optical electric field signal
250: Electric field compensation circuit at compensation period T/2
251: Compensation quantity input terminal
300: Non-coherent optical electric field receiver of the present invention
301: Retiming & down-sampling circuit
302: Phase integration circuit
311: Input complex electric field signal string
312: Output complex electric field signal string
313: Delay circuit
314: Complex tap multiplier circuit
315: Complex adder circuit
316: Compensation data setting signal
317: Electric field compensation lookup table
320: Direct current removal type balance receiver
321: Dispersion compensation quantity setter circuit
322: Offset compensation signal for dI component
323: Offset compensation signal for dQ component
324: Wavelength dispersion compensation data
325: Wavelength dispersion quantity setter signal
326: Clock extractor circuit
327: Sampling block
330: Tap generator
331: Multilevel waveform generator circuit
332: Wavelength dispersion simulator circuit
333: Delay detector simulator circuit
334: Average intensity calculation circuit
335: Inverter circuit
340: Front end equalizer circuit
341: Phase jitter removal circuit
342: Adaptive equalizing circuit
343: Error signal
344: Compensation quantity calculation circuit
345: Compensation signal
350: Optical electric field transmitter of the present invention
351: Nyquist narrow-bandwidth filter
352: Optical bandwidth-narrowed filter
353: Bandwidth compensation filter

The invention claimed is:
1. An optical receiver to receive an optical modulation signal at a pre-established symbol time of two or more levels as the optical signal, and comprising:
a coupling type optical delay detection-receiver containing a delay approximately matching the symbol time of the received optical symbol;
an AD converter;
a differential phase calculator circuit;
a phase integration circuit;
an optical amplitude detection unit to extract the amplitude component from the optical signal;
an optical electric field signal regenerator circuit; and
a transmission degradation equalizer to compensate for transmission degradation on the transmission path;
wherein the coupling type optical delay detection-receiver includes a delay approximately matching the symbol time of the received optical signal, and detects and outputs the received optical signal, and the AD converter converts the output signal from the coupling type optical delay detector into a digital signal, and
the differential phase calculator circuit inputs the digital signal and calculates the differential phase relative to the optical signal of the immediately prior symbol time, for approximately each symbol time, and
the phase integration circuit integrates the calculated differential phase that was input with each symbol time of the received signal and calculates the phase information, and
the optical amplitude detection unit extracts the amplitude component of the received optical signal, and
the optical electric field signal regenerator circuit combines the calculated phase information with the optical amplitude information obtained in the optical amplitude detection unit and regenerates an optical electric field signal, and the transmission degradation equalizer inputs a regenerated optical electric field signal and equalizes the transmission degradation.

2. The optical receiver according to claim 1, wherein the equalizing time periods of the transmission degradation equalizer approximately match the symbol time.

3. The optical receiver according to claim 1, wherein the timing when the phase integration circuit performs phase integration, approximately matches the symbol center time of the received optical signal.

4. The optical receiver according to claim 3, further comprising a retiming circuit, wherein waveform oversampling is performed in an AD converter sampling period that is smaller than the symbol time, the output signal from the AD converter is input to the retiming circuit, and the retiming circuit converts the input signal to a digital sample stream with a sampling time approximately matching the symbol center time of the received optical signal and the sampling period matches the symbol time, and outputs the digital sample stream to the phase integration circuit.

5. The optical receiver according to claim 3, further comprising a clock extraction circuit, wherein the clock extraction circuit utilizing a portion of the output signal from the coupling type optical delay detector or a portion of the output signal from the optical amplitude detection unit as the input signal, extracts a clock signal matching the symbol time of the optical signal to the period received from the input signal, and outputs the clock signal to the AD converter; and the AD converter samples the output signal from the coupling type optical delay detector in compliance with the clock signal, and obtains a sample stream where the sample timing approximately matches the symbol center time.

6. The optical receiver according to claim 1, further comprising a phase jitter removal circuit to eliminate phase jitter from inputs including the phase information output from the phase integration circuit, or regenerated optical electric field signals, or optical electric field signals output from the transmission degradation equalizer.

7. The optical receiver according to claim 1, further comprising an electrical phase differential detection circuit, wherein the electrical phase differential detection circuit inputs the optical electric field signal after equalizing of the transmission degradation, implements delay-detection or differential-detection for the entire optical electric field signal that was input or only the phase component of the optical electric field signal by utilizing digital numeric processing and outputs the delay-detected or differential-detected signal.

8. The optical receiver according to claim 1, wherein the optical electrical field amplitude detector unit comprises an optical intensity receiver, a second AD converter, and a square root processing circuit, wherein the optical intensity receiver converts the intensity component of a portion of a branched received signal that was input, to an electrical signal, and outputs that electrical signal;

the second AD converter converts the electrical signal to a digital sample stream and outputs that digital sample stream;

the square root processing circuit inputs the digital sample stream, performs square root processing, and outputs the processing results.

9. The optical receiver according to claim 1, wherein the transmission degradation equalizer is an adaptive equalizing circuit that automatically compensates for the waveform degradation.

10. The optical receiver according to claim 1, wherein the transmission degradation equalizer is a digital filter including an inverse transmission characteristic for wavelength dispersion along the transmission path.

11. The optical receiver according to claim 10, wherein the transmission degradation equalizer includes an offset compensation unit to compensate for the direct current offset component of the optical electric field signal;

the offset compensation unit adds an offset signal according to the pre-established wavelength dispersion quantity to the optical electric field signal.

12. The optical receiver according to claim 1, comprising a bandwidth-narrowed Nyquist filter for a bandwidth of $1/(2Ts)$ or more and $1/Ts$ or less relative to the symbol time $Ts$;

wherein the bandwidth-narrowed Nyquist filter inputs an output signal from the AD converter and narrows the band of the digital signal.

13. The optical receiver according to claim 12, wherein the optical receiver includes a bandwidth compensation filter to compensate for waveform distortion in the bandwidth-narrowed signal after compensating for linear degradation.

14. An optical transmission system including;

an optical transmitter to generate optical signals modulated by information signals, and an optical receiver according to claim 1, wherein an optical signal after output from the optical transmitter and after transmission on the optical fiber transmission path, is received by the optical receiver and converted into information signals and the information signals are output.

15. The optical transmission system according to claim 14, wherein the optical transmitter includes a bandwidth-narrowed Nyquist filter for a bandwidth of $1/(2Ts)$ or more and $1/Ts$ or less relative to the symbol time $Ts$, and the bandwidth-narrowed Nyquist filter narrows the bandwidth of the optical signal for generating beforehand in an electrical region and outputs the optical signal.

16. The optical transmission system according to claim 14, including an optical bandwidth narrowing filter for a bandwidth of $1/Ts$ or more and $2/Ts$ or less relative to the symbol time $Ts$, and the optical bandwidth narrowing filter is inserted in the optical transmitter or the optical receiver or along optical transmission path to narrow the band of the optical signal.

17. The optical transmission system according to claim 14, wherein the optical transmitter further includes a phase pre-integration circuit, and the phase pre-integration circuit integrates the phase of the optical signal for transmission for each symbol time.

18. The optical transmission system according to claim 14, wherein the optical transmitter further includes a pre-equalizer circuit, the pre-equalizer circuit includes a function to pre-equalize on the transmitting side, at least the linear degradation on the optical fiber transmission path including wavelength dispersion, or degradation in the waveform due to the optical receiver.

19. The optical transmission system according to claim 15, wherein the optical receiver includes a bandwidth compensation filter to compensate for waveform distortion in the bandwidth-narrowed signal after compensating for linear degradation.

* * * * *